United States Patent
Uemura et al.

(10) Patent No.: US 9,351,321 B2
(45) Date of Patent: May 24, 2016

(54) MOBILE STATION APPARATUS, BASE STATION APPARATUS, AND RADIO LINK SYNCHRONIZATION DETERMINING METHOD

(71) Applicant: SHARP KABUSHIKI KAISHA, Osaka-shi, Osaka (JP)

(72) Inventors: Katsunari Uemura, Osaka (JP); Shohei Yamada, Osaka (JP); Yasuyuki Kato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/873,694

(22) Filed: Oct. 2, 2015

(65) Prior Publication Data

US 2016/0029411 A1    Jan. 28, 2016

Related U.S. Application Data

(63) Continuation of application No. 13/145,306, filed as application No. PCT/JP2009/071402 on Dec. 24, 2009, now abandoned.

(30) Foreign Application Priority Data

Jan. 20, 2009    (JP) .................................. 2009-009966

(51) Int. Cl.
*H04B 1/7087*    (2011.01)
*H04B 7/26*    (2006.01)
(Continued)

(52) U.S. Cl.
CPC ........... *H04W 74/085* (2013.01); *H04B 1/7085* (2013.01); *H04B 1/7087* (2013.01);
(Continued)

(58) Field of Classification Search
None
See application file for complete search history.

(56) References Cited

U.S. PATENT DOCUMENTS

| 5,943,334 A | 8/1999 | Buskens et al. |
| 8,369,269 B2 | 2/2013 | Nakashima et al. |

(Continued)

FOREIGN PATENT DOCUMENTS

| EP | 1 515 457 A2 | 3/2005 |
| RU | 2 272 359 C2 | 10/2005 |

(Continued)

OTHER PUBLICATIONS

Author Unknown, Carrier Aggregation for LTE-A, Submission to 3GPP TSG RAN WG1 meeting #55bis, Document No. R1-090187, Jan. 16, 2009, pp. 1-3.*

(Continued)

*Primary Examiner* — Christopher Crutchfield
(74) *Attorney, Agent, or Firm* — Birch, Stewart, Kolasch & Birch, LLP

(57) ABSTRACT

A mobile station (MS) performs a measurement of cells on a plurality of downlink frequencies used for a connection with a base station apparatus. The MS also detects a first indication or a second indication, based on the measurement of each cell designated by the base station apparatus, the first indication indicating a measurement result of a cell becomes lower than a first threshold and the second indication indicating a measurement result of a cell becomes higher than a second threshold. In addition, the MS, in a case where a reconnection procedure is started by expiring a timer corresponding to the each cell, selects a cell, and initiates a random access procedure for requesting a reconnection in the selected cell. Further, the timer is started if the first indication is indicated consecutively for a certain number of times.

8 Claims, 19 Drawing Sheets

(51) Int. Cl.
 H04B 1/7085 (2011.01)
 H04B 7/212 (2006.01)
 H04W 74/08 (2009.01)
 H04W 56/00 (2009.01)
 H04W 48/20 (2009.01)

(52) U.S. Cl.
 CPC ............ *H04B 7/2125* (2013.01); *H04B 7/2678* (2013.01); *H04W 48/20* (2013.01); *H04W 56/00* (2013.01); *H04W 56/0015* (2013.01)

(56) References Cited

U.S. PATENT DOCUMENTS

| | | | |
|---|---|---|---|
| 2003/0091018 | A1 | 5/2003 | Oliver et al. |
| 2005/0054309 | A1 | 3/2005 | Masuda |
| 2005/0281222 | A1 | 12/2005 | Ranta-Aho et al. |
| 2006/0146753 | A1 | 7/2006 | Park et al. |
| 2007/0020877 | A1* | 1/2007 | Tseng et al. ............... 438/424 |
| 2009/0011718 | A1 | 1/2009 | Chun et al. |
| 2009/0268785 | A1 | 10/2009 | Sato |
| 2010/0098051 | A1* | 4/2010 | Uemura ...................... 370/350 |
| 2010/0098052 | A1 | 4/2010 | Suzuki |
| 2010/0113054 | A1 | 5/2010 | Iwamura et al. |
| 2011/0058529 | A1 | 3/2011 | Uemura |
| 2011/0103367 | A1 | 5/2011 | Ishii |

FOREIGN PATENT DOCUMENTS

| | | | |
|---|---|---|---|
| WO | WO 2006/000876 A1 | | 1/2006 |
| WO | WO 2007/116757 A1 | | 10/2007 |
| WO | WO 2007/148458 A1 | | 12/2007 |
| WO | WO 2008/111606 | * | 9/2008 |
| WO | WO 2008/111606 A1 | | 9/2008 |
| WO | WO 2009/022668 A1 | | 2/2009 |

OTHER PUBLICATIONS

Author Unknown, Downlink out-of-sync, Submission to TSG-RAN Working Group 1 meeting #10, Document No. R1-00-0103, Jan. 21, 2000, pp. 1-5.*
3GPP TR 36.913 V8.0.0, 3rd Generation Partnership Project; Technical Specification Group Radio Access Network; Requirements for Further Advancements for E-UTRA, (LTE-Advanced), (Release 8), Jun. 2008.
3GPP TS 36.331 V8.4.0, 3rd Generation Partnership Project; Technical Specification Group Radio Access Network; Evolved Universal Terrestrial Radio Access (E-UTRA); Radio Resource Control (RRC);Protocol specification (Release 8), Section 5.3.11, Dec. 2008.
International Search Report for PCT/JP2009/071402, mailed on Apr. 13, 2010.
Motorola, "Carrier Aggregation for LTE-A: E-NodeB Issues", 3GPP TSG RAN1, Meeting #54bis, R1-083821, Sep. 29-Oct. 3, 2008, Prague, Czech Republic.
NTT DOCOMO, Inc., "Updated Views on Support of Wider Bandwidth in LTE-Advanced", 3GPP TSG RAN WG 1, Meeting #54bis, R1-083677, Sep. 29-Oct. 3, 2008, Prague, Czech Republic.

* cited by examiner

MOBILE STATION APPARATUS, BASE STATION APPARATUS, AND RADIO LINK SYNCHRONIZATION DETERMINING METHOD

This application is a Continuation of copending application Ser. No. 13/145,306, filed on Aug. 18, 2011, which is a U.S. National Phase of PCT International Application No. PCT/JP2009/071402, filed on Dec. 24, 2009, and which claims priority to Application No. 2009-009966 filed in Japan on Jan. 20, 2009. The entire contents of all the above applications are hereby incorporated by reference.

TECHNICAL FIELD

The present invention relates to a mobile station apparatus, a base station apparatus, and a radio link synchronization determining method, and, more particularly, to a radio link synchronization determining method when a plurality of frequency bands are received at the same time.

BACKGROUND ART

The standard-setting organization 3GPP (3rd Generation Partnership Project) is discussing Evolved Universal Terrestrial Radio Access (hereinafter, EUTRA) evolved from the third generation mobile communication method and an advanced version thereof, i.e., Advanced EUTRA (also referred to as LTE-Advanced) (Nonpatent Document 1).

In Advanced EUTRA, carrier aggregation is proposed as a technique enabling higher-speed data transmission while maintaining the compatibility with EUTRA (e.g., Nonpatent Documents 2 and 3). The carrier aggregation is a technique for improving a data rate by preparing a receiving apparatus that includes one receiver having a reception bandwidth exceeding a maximum transmission bandwidth of a transmitting apparatus or a plurality of receivers having a reception bandwidth equal to the maximum transmission bandwidth of the transmitting apparatus or exceeding the transmission bandwidth and by receiving the data of the transmitting apparatus transmitted from a plurality of different frequency bands (carrier frequencies) with the respective receivers corresponding to the different frequency bands in the receiving apparatus. Hereinafter, a receiving apparatus and a transmitting apparatus in downlink transmission will be referred to as a mobile station apparatus and a base station apparatus, respectively, and a receiving apparatus and a transmitting apparatus in uplink transmission will be referred to as a base station apparatus and a mobile station apparatus, respectively; however, the applicable range of the present invention is not necessarily limited to these apparatuses.

A mobile station apparatus of EUTRA determines whether a currently communicating base station apparatus is appropriate as a communication destination by detecting a radio link problem in a higher layer (Nonpatent Document 4, Section 5.3.11). The radio link problem is a problem generated in a lower layer (a physical layer problem in a physical layer or a random access problem in a data link layer). The physical layer problem is detected in the physical layer by comparing reception quality of a transmission signal from the base station apparatus with a threshold value. A random access problem is detected by MAC (medium access control) of the data link layer if the number of preamble transmissions reaches the maximum number of transmissions.

PRIOR ART DOCUMENTS

Nonpatent Document

Nonpatent Document 1: 3GPP TR36.913, Requirements for Further Advancements for E-UTRA. V8.0.0 http://www.3gpp.org/ftp/Specs/html-info/36913.htm Nonpatent Document 2: Motorola, R1-083821, 3GPP TSG-RAN1 Meeting #54bis, Prague, Czech Republic, Sep. 29-Oct. 3, 2008

Nonpatent Document 3: NTT DoCoMo, R1-083677, 3GPP TSG-RAN WG1 Meeting #54bis, Prague, Czech Republic, Sep. 29-Oct. 3, 2008

Nonpatent Document 4: 3GPP TS36.331, Radio Resource Control (RRC); Protocol specification. V8.4.0 http://www.3gpp.org/ftp/Specs/html-info/36331.htm

SUMMARY OF THE INVENTION

Problem to be Solved by the Invention

Although the radio link problem must be detected even in a mobile station apparatus in the carrier aggregation in terms of utilization efficiency of radio resources, the physical layer problem and the random access problem of a mobile station apparatus of Advanced EUTRA (hereinafter, simply, a mobile station apparatus) has not been discussed so far. In the present invention, a solution for a problem of a conventional method related to the physical layer problem will particularly be described.

With regard to a mobile station apparatus performing communication in a plurality of frequency bands (also referred to as component carriers (carrier elements)) through the carrier aggregation, Nonpatent Documents 1 to 4 disclose nothing about which component carrier is preferred for making a radio link synchronization determination for detecting a physical layer problem based on reception quality of a cell allocated on a component carrier (hereinafter, component carrier, for short). For example, when the reception quality of a certain component carrier severely deteriorates and the reception quality of a separately received component carrier is sufficiently favorable, it is problematic that a downlink synchronization state cannot correctly be managed since such a reception quality state is not assumed in the radio link synchronization determination which is the same as that of mobile station apparatuses of EUTRA.

The present invention was conceived in view of the situations and it is therefore an object of the present invention to provide a mobile station apparatus, a base station apparatus, a program, and a recording medium capable of implementing efficient radio link synchronization determination while a mobile station apparatus is receiving a plurality of frequency bands.

Means for Solving the Problem

A mobile station apparatus of the present invention has a function of measuring each reception quality of a plurality of component carriers during carrier aggregation to execute radio link synchronization determination based on a measurement result.

A first technical means according to the present invention is a mobile station apparatus communicating with base station apparatuses, comprising: a determining section that measures reception qualities of cells of frequency bands of a plurality of downlinks having different frequencies which are connected to the base station apparatuses, the determining section detecting a downlink synchronization error or a downlink synchronization recovery used for determination of a downlink synchronization state for each cell of downlink frequency bands by comparing the reception qualities of the cells of the plurality of downlink frequency bands with a downlink synchronization error determining threshold value and a downlink synchronization recovery determining threshold value for each cell of down link frequency bands, the determining section starting timing of a timer of each cell of downlink frequency band if the downlink synchronization error is consecutively detected for a certain number of times, the determining section determining the downlink synchronization state as a downlink synchronization loss of each cell of downlink frequency bands when the timer of each cell of downlink frequency bands is expired, the determining section determining the downlink synchronization state as a downlink synchronization loss to release a radio resource and start reconnection when the timers are expired in all the measured downlink frequency bands, the determining section stopping the timing of the timer of each cell of the downlink frequency bands to determine the downlink synchronization state as downlink synchronization of each cell of downlink frequency bands if the downlink synchronization recovery of each cell of the downlink frequency bands is consecutively detected for a certain number of times during the timing of the timer of each cell of the downlink frequency bands.

A second technical means is a mobile station apparatus communicating with base station apparatuses, wherein the mobile station apparatus measures reception qualities of cells of frequency bands of a plurality of downlink having different frequencies which are connected to the base station apparatuses, detects a first determination information indicating quality deterioration of a downlink that is used for determining a state of radio link of the mobile station apparatus or a second information indicating recovery of quality of the downlink for each cell from the reception qualities based on reception quality of each cell designated by the base station apparatus, when a timer that starts timing for the each cell if the first determination information is detected consecutively for a certain number of times is expired, the mobile station apparatus determines that a downlink corresponding to the cell is out of synchronization and stops a transmission of an uplink of the cell if the state of radio link of the mobile station apparatus is not determined as loss of synchronization, and starts reconnection procedure by releasing radio resources of the cell if the state of radio link of the mobile station apparatus is determined as loss of synchronization.

A third technical means is a mobile station apparatus communicating with base station apparatuses, wherein the mobile station apparatus measures reception qualities of cells of frequency bands of a plurality of downlinks having different frequencies which are connected to the base station apparatuses, detects a first determination information indicating quality deterioration of a downlink that is used for determining a state of radio link of the mobile station apparatus or a second information indicating recovery of quality of the downlink for each cell from the reception qualities based on reception quality of each cell designated by the base station apparatus, when a timer that starts timing for the each cell if the first determination information is detected consecutively for a certain number of times is expired, the mobile station apparatus stops a transmission of an uplink of the cell if the state of radio link of the mobile station apparatus is not determined as loss of synchronization, and restarts a transmission of an uplink of the cell if the second determination information is detected consecutively for a certain number of times.

A fourth technical means is a base station apparatus connected to the mobile station apparatus of any one of the first to third technical means, wherein the base station apparatus determines interrupted data destined for the mobile station apparatus based on a cell ID and a mobile station apparatus ID provided from the mobile station apparatus to resume transmission of the data when performing reconnection procedure.

A fifth technical means is a radio link synchronization determining method in a mobile station apparatus communicating with base station apparatuses, comprising: a step of measuring reception qualities of cells of frequency bands of a plurality of downlinks having different frequencies which are connected to the base station apparatuses, a step of detecting a downlink synchronization error or a downlink synchronization recovery used for determination of a downlink synchronization state for each cell of downlink frequency bands by comparing the reception qualities of the cells of the plurality of downlink frequency bands with a downlink synchronization error determining threshold value and a downlink synchronization recovery determining threshold value for each cell of downlink frequency bands, a step of starting timing of a timer of each cell of downlink frequency band if the downlink synchronization error is consecutively detected for a certain number of times, determining the downlink synchronization state as a downlink synchronization loss of each cell of downlink frequency bands when the timer of each cell of downlink frequency bands is expired, and determining the downlink synchronization state as a downlink synchronization loss to release a radio resource and start reconnection when the timers are expired in cells of all the measured downlink frequency bands, and a determining step of stopping the timing of the timer of each cell of downlink frequency bands to determine the downlink synchronization state as downlink synchronization of each cell of downlink frequency bands if the downlink synchronization recovery of each cell of the downlink frequency bands is consecutively detected for a certain number of times during the timing of the timer of each cell of downlink frequency bands.

A sixth technical means is a radio link synchronization determining method in a mobile station apparatus communicating with base station apparatuses, comprising: a step of measuring reception qualities of cells of frequency bands of a plurality of downlink having different frequencies which are connected to the base station apparatuses, a step of detecting a first determination information indicating quality deterioration of a downlink that is used for determining a state of radio link of the mobile station apparatus or a second information indicating recovery of quality of the downlink for each cell from the reception qualities based on reception quality of each cell designated by the base station apparatus, when a timer that starts timing for the each cell if the first determination information is detected consecutively for a certain number of times is expired, a step of determining that a downlink corresponding to the cell is out of synchronization and stopping a transmission of an uplink of the cell if the state of radio link of the mobile station apparatus is not determined as loss of synchronization and detecting the first determination information or the second determination information for each cell based on respective reception qualities of other cells, and a step of starting reconnection procedure by releasing radio resources of the cell if the state of radio link of the mobile station apparatus is determined as loss of synchronization.

A seventh technical means is a radio link synchronization determining method in a mobile station apparatus communicating with base station apparatuses, comprising: a step of measuring reception qualities of cells of frequency bands of a plurality of downlink having different frequencies which are connected to the base station apparatuses, a step of detecting a first determination information indicating quality deterioration of a downlink that is used for determining a state of radio link of the mobile station apparatus or a second information indicating recovery of quality of the downlink for each cell from the reception qualities based on reception quality of each cell designated by the base station apparatus, when a timer that starts timing for the each cell if the first determination information is detected consecutively for a certain number of times is expired, a step of stopping a transmission of an uplink of the cell if the state of radio link of the mobile station apparatus is not determined as loss of synchronization, and a step of restarting a transmission of an uplink of the cell if the second determination information is detected consecutively for a certain number of times.

Effect of the Invention

The present invention enables provision of a mobile station apparatus, a base station apparatus, a program, and a recording medium capable of implementing efficient radio link synchronization determination while receiving a plurality of frequency bands.

MODES FOR CARRYING OUT THE INVENTION

Figure 17:
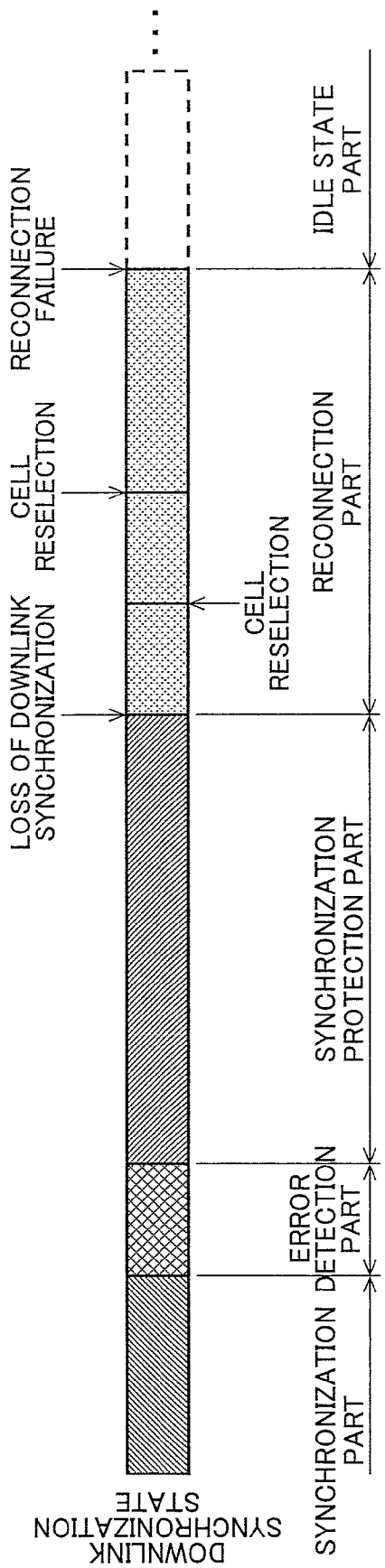
FIG. 17 is a diagram for explaining a conventional radio link synchronization determining procedure.
Figure 18:
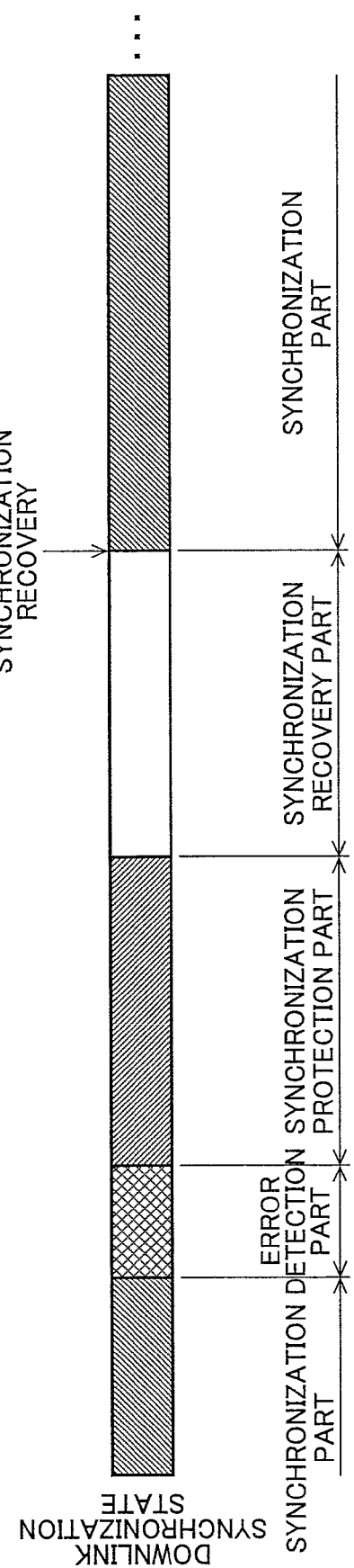
FIG. 18 is another diagram for explaining the conventional radio link synchronization determining procedure.

Radio link synchronization determination, carrier aggregation, and physical channels of embodiments of the present invention will be described.
(1) Radio Link Synchronization Determination (Radio Link Monitoring)
FIGS. 17 and 18 depict an example of a conventionally used radio link synchronization determination procedure. A mobile station apparatus manages a downlink synchronization state by comparing quality of any one of received downlink channels with a threshold value.
FIG. 17 depicts an example of a transition of a downlink synchronization state of a mobile station apparatus in the case of making a transition to the idle state (the state of a mobile station apparatus not wirelessly connected to a base station apparatus) when neither recovery of downlink synchronization nor reconnection can be achieved after a downlink synchronization error of a downlink channel is detected. If a downlink synchronization error due to quality deterioration is detected in a downlink channel, the mobile station apparatus makes a transition of the downlink synchronization state from a synchronization part to an error detection part to determine whether the downlink synchronization error is temporal.
If the downlink synchronization error is continuously detected in the error detection part and the downlink synchronization error is consecutively detected for a certain number of times, the mobile station apparatus determines that a radio link problem (physical layer problem) occurs, subsequently makes a state transition of the downlink synchronization state to a synchronization protection part for attempting recovery of synchronization, and activates a synchronization protection timer to time the synchronization protection part at the same time.
If the quality of the downlink channel does not recover even when the synchronization protection timer is expired, the mobile station apparatus determines that a downlink synchronization loss occurs, makes a transition of the state to a reconnection part for attempting reconnection, and activates a reconnection timer to time the reconnection part at the same time. In the reconnection part, the mobile station apparatus repeatedly performs a cell reselection procedure for selecting a cell having favorable quality. After selecting a favorable cell according to the cell reselection procedure, the mobile station apparatus initiates a random access procedure and makes a reconnection request to the favorable cell. If permission for the reconnection request is not given from the base station apparatus until the timing of the reconnection timer is expired, the mobile station apparatus determines that the reconnection is failed, releases radio resources, and makes a transition to an idle state part where the mobile station apparatus is not wirelessly connected to the base station apparatus.

FIG. 18 depicts a transition of a downlink synchronization state of a mobile station apparatus when the downlink synchronization recovers before a downlink synchronization loss occurs after a downlink synchronization error of a downlink channel is detected. This is the same as that shown in FIG. 17 before the transition of the downlink synchronization state is made to the synchronization protection part.

If the quality of the downlink channel recovers before the synchronization protection timer is expired, the mobile station apparatus makes a transition of the downlink synchronization state to a synchronization recovery part for waiting for recovery of synchronization. If favorable quality is consecutively acquired for a certain number of times after the transition to the synchronization recovery part, the mobile station apparatus determines that the downlink synchronization has recovered, makes a transition of the state to the synchronization part, and stops the synchronization protection timer.

(2) Carrier Aggregation

Figure 19:
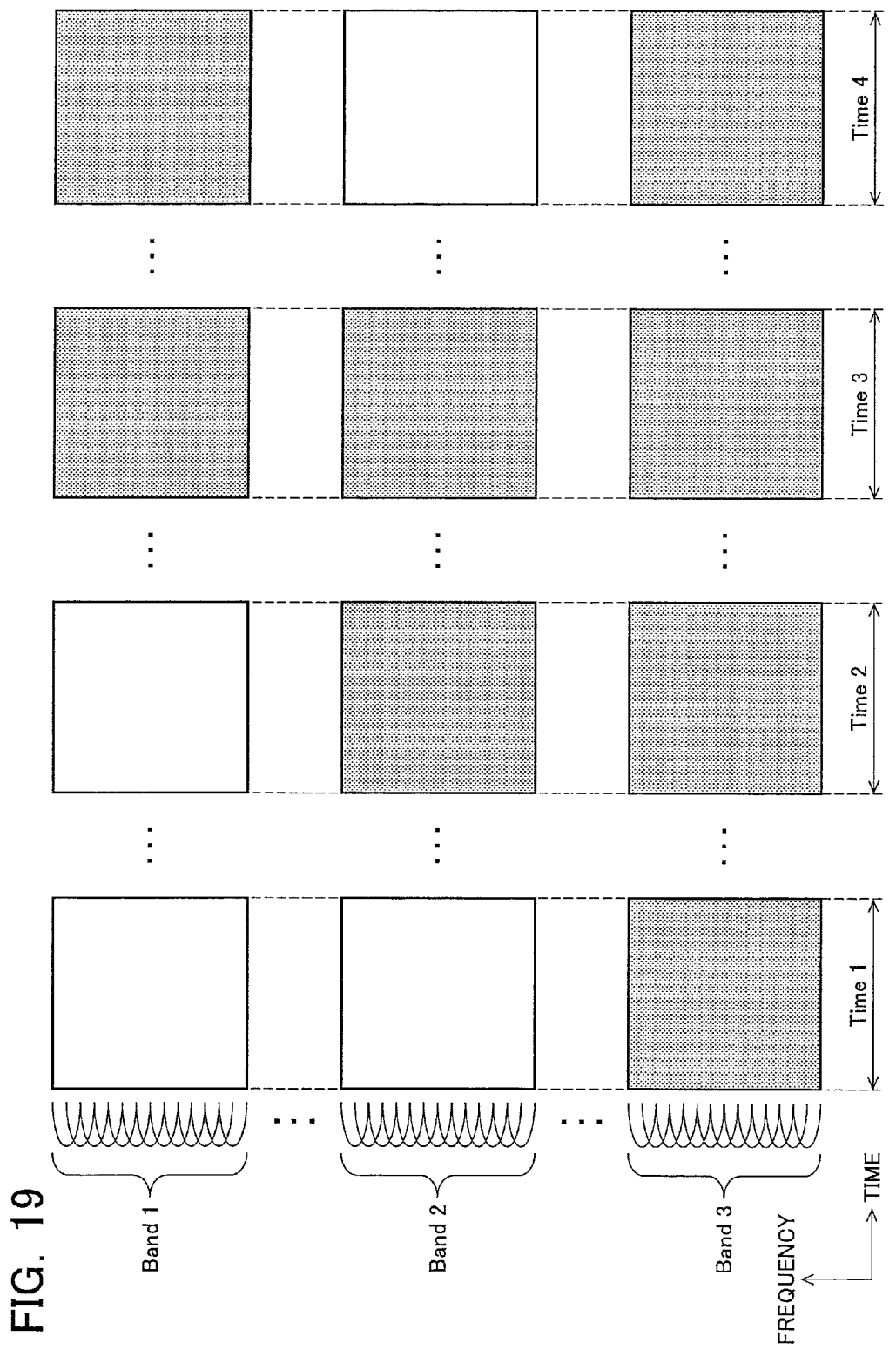
FIG. 19 is a diagram for explaining increase and decrease of reception frequency bands using carrier aggregation.

FIG. 19 is a diagram of an example of carrier aggregation. Each of Band 1 to Band 3 represents a downlink frequency band (component carrier) transmitted by the base station apparatus and has a transmission bandwidth of 20 MHz, for example. Band 1 to Band 3 may be continuous frequency bands or may be completely or partially discontinuous frequency bands. For example, if usable frequency bands are 800-MHz, 2.4-GHz, and 3.4-GHz bands, Bands 1, 2, and 3 may be transmitted through any 20-MHz downlink component carriers of 800-MHz, 2.4-GHz, and 3.4-GHz bands, respectively.

Bands 1 to 3 may be transmitted through a plurality of continuous or discontinuous 20-MHz downlink component carriers within the same frequency band, for example, 2.4-GHz band. The number of Bands may be more than three. The transmission bandwidths of the component carriers may be bandwidths narrower than 20 MHz or may be different from each other. However, the mobile station apparatus must have a total reception bandwidth of 20 MHz or more and, in this example, up to three frequency bands of 20 MHz can be received at the same time and the total reception bandwidth is 60 MHz.

In the example of FIG. 19, at a certain time point, Time 1, the mobile station apparatus uses 20 MHz of Band 3 to communicate with the base station apparatus and concurrently performs measurements of Band 1 and Band 2. At another time point, Time 2, Band 2 is added, and the mobile station apparatus uses a total of 40 MHz of Band 2 and Band 3 to communicate with the base station apparatus and concurrently performs measurement of reception quality of Band 1. At yet another time point, Time 3, Band 1 is added, and the mobile station apparatus uses a total of 60 MHz of Band 1 to Band 3 to communicate with the base station apparatus. At further time point, Time 4, Band 2 is deleted and the mobile station apparatus uses a total of 40 MHz of Band 1 and Band 3 to communicate with the base station apparatus and concurrently performs measurement of reception quality of Band 2.

As described above, a data rate can considerably be improved by using the carrier aggregation without significantly changing the configuration of the base station apparatus. The time lengths of Time 1 to Time 4 are variable. If the utilized communication method is OFDMA (Orthogonal Frequency Division Multiplexing Access), the frequency bands subjected to the carrier aggregation must have equivalent OFDM symbol timings. Equivalent OFDM symbol timings mean that the deviations of reception timings of the OFDM symbols of the frequency bands fall within a guard time at the reception antenna of the mobile station apparatus.

(3) Physical Channels

The physical channels used in EUTRA and Advanced EUTRA include a physical broadcast information channel, an uplink data channel, a downlink data channel, a downlink shared control channel, an uplink shared control channel, a random access channel, a synchronization signal, a downlink reference signal, an uplink reference signal, etc.

Although a physical channel may be added or a channel configuration may be modified in EUTRA and Advanced EUTRA in the future, the description of the embodiments of the present invention will not be affected even if modified.

The physical broadcast information channel (PBCH: Physical Broadcast Channel) is transmitted for the purpose of notification of control parameters (broadcast information) commonly used by mobile station apparatuses within a cell. For the broadcast information not provided through the physical broadcast information channel, the downlink shared control channel is used for notification of a transmission resource and the downlink data channel is used for the transmission. The broadcast information includes a cell global ID unique in the system, uplink frequency band information, etc.

The downlink reference signal is a pilot signal transmitted with a predetermined power for each cell. The downlink reference signal is a signal periodically repeated at predetermined time intervals (e.g., one frame) and the mobile station apparatus receives the downlink reference signal at predetermined time intervals and measures the reception quality for determining the reception quality of each cell. The downlink reference signal is also used as a referential signal for demodulating the downlink data transmitted concurrently with the downlink reference signal. A sequence used for the downlink reference signal may be any sequence as long as a sequence is uniquely identifiable for each cell. Although the downlink reference signal may be described as DL-RS (Downlink Reference signal) in some cases, the use and the meaning thereof are the same.

The downlink shared control channel (PDCCH: Physical Downlink Common Channel) is transmitted by a few leading symbols of each sub-frame and is used for the purpose of giving instructions to the mobile station apparatus for resource allocation information in accordance with the scheduling of the base station apparatus and an adjustment amount of transmission power. The mobile station apparatus must receive the downlink shared control channel before transmission/reception of traffic data (user data) and control messages to acquire uplink resource allocation at the time of transmission and information of downlink resource allocation at the time of reception.

The random access channel (PRACH: Physical Random Access Channel) is a channel used for transmitting a preamble sequence and has a guard time. The random access channel is used as a procedure for accessing to the base station apparatus in the asynchronous state of the uplink transmission timing and is used for a resource request and adjustment of the uplink transmission timing.

Other physical channels have no relation to the embodiments of the present invention and therefore will not be described in detail.

Figure 1:
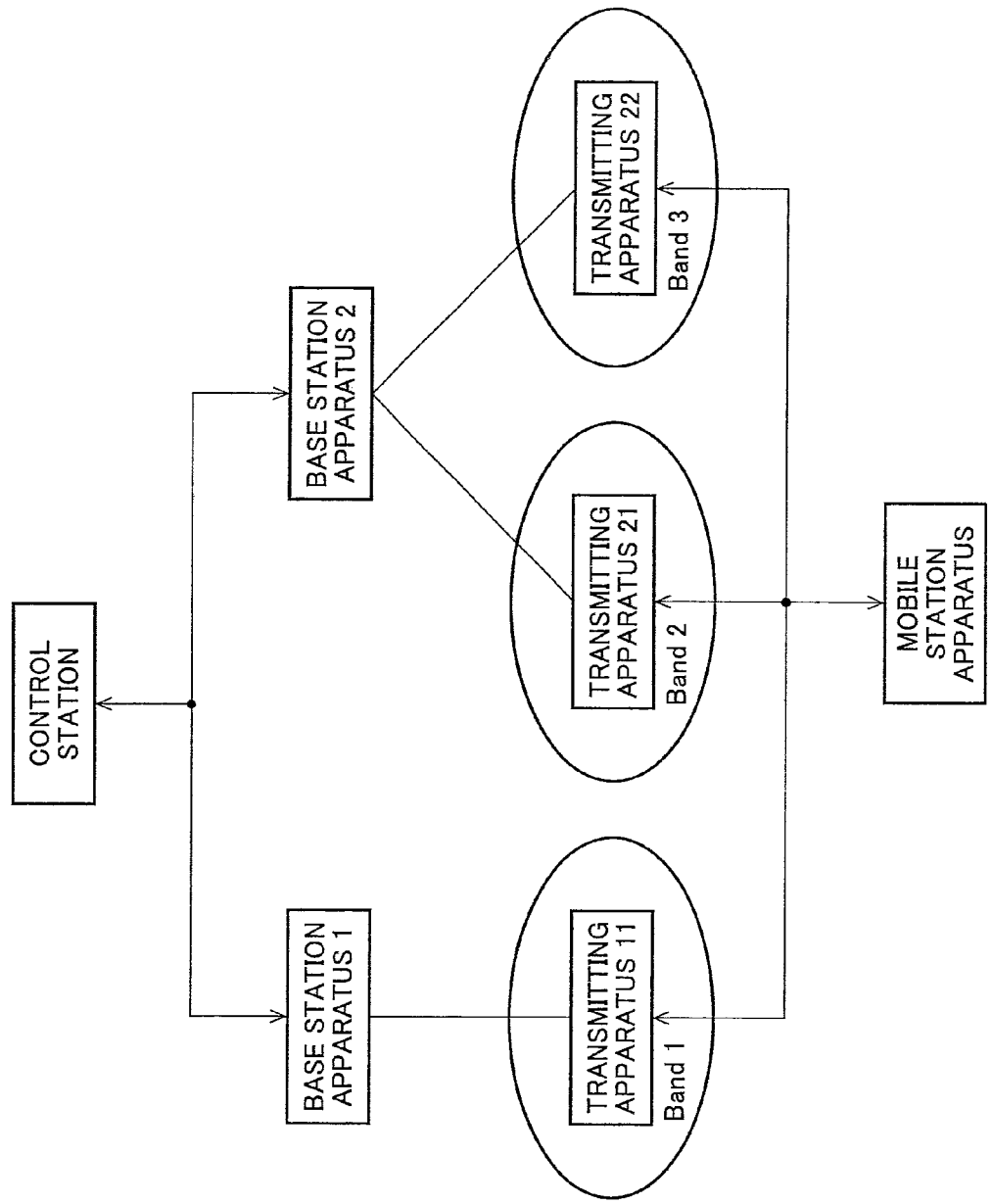
FIG. 1 is a diagram of an example of a network configuration of the present invention.

FIG. 1 is a diagram of an example of a network configuration of the present invention. If the carrier aggregation enables the mobile station apparatus to concurrently communicate in a plurality of frequency bands (Band 1 to Band 3), it is conceivable that a network configuration includes one certain base station apparatus including a transmitting apparatus (receiving apparatus) for each of a plurality of frequency bands (Band 2 and Band 3) or includes one base station apparatus including one transmitting apparatus (receiving apparatus) for each frequency band (Band 1) and the both cases may be mixed; however, this embodiment can be implemented in any configuration without problem. The base station apparatuses can be managed by a higher control station or the collaborative control may be performed between the base station apparatuses to implement the carrier aggregation.

Figure 2:
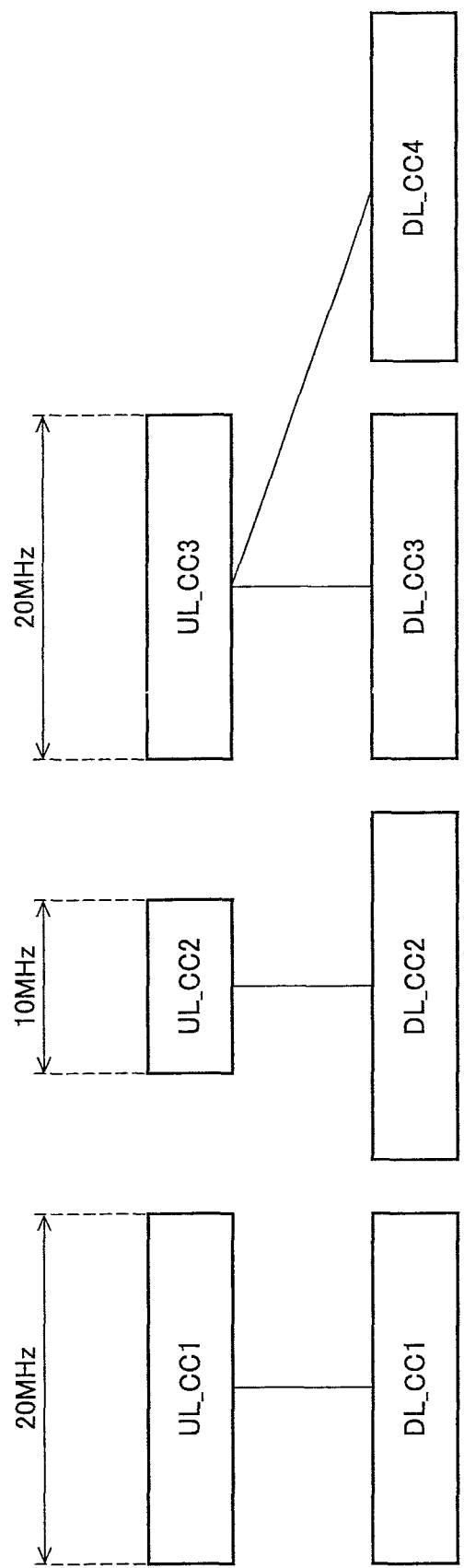
FIG. 2 is a diagram of correspondence relation between downlink component carriers and uplink component carriers of the present invention.

FIG. 2 is a diagram of an example of correspondence relation between downlink carrier elements and uplink carrier elements configured when the mobile station apparatus of the present invention performs the carrier aggregation. A downlink carrier element DL_CC1 corresponds to an uplink carrier element UL_CC1. Therefore, ACK/NACK and feedback of reception quality of data received through DL_CC1 are transmitted by using the resource of UL_CC1. As indicated by UL_CC2 and DL_CC2, bandwidths may be different between a downlink carrier element and an uplink carrier element. A plurality of downlink carriers may correspond to an uplink carrier element. In the example of FIG. 2, ACK/NACK and feedback of reception quality of data received through both DL_CC3 and DL_CC4 are transmitted by using the resource of UL_CC3. The mobile station apparatus recognizes a carrier element as a cell without particular regard to which base station apparatus transmits a downlink carrier element and which base station apparatus receives an uplink carrier element. The mobile station apparatus acquires information such as a frequency band and a bandwidth of a corresponding uplink carrier element from broadcast information of a selected cell.

Figure 3:
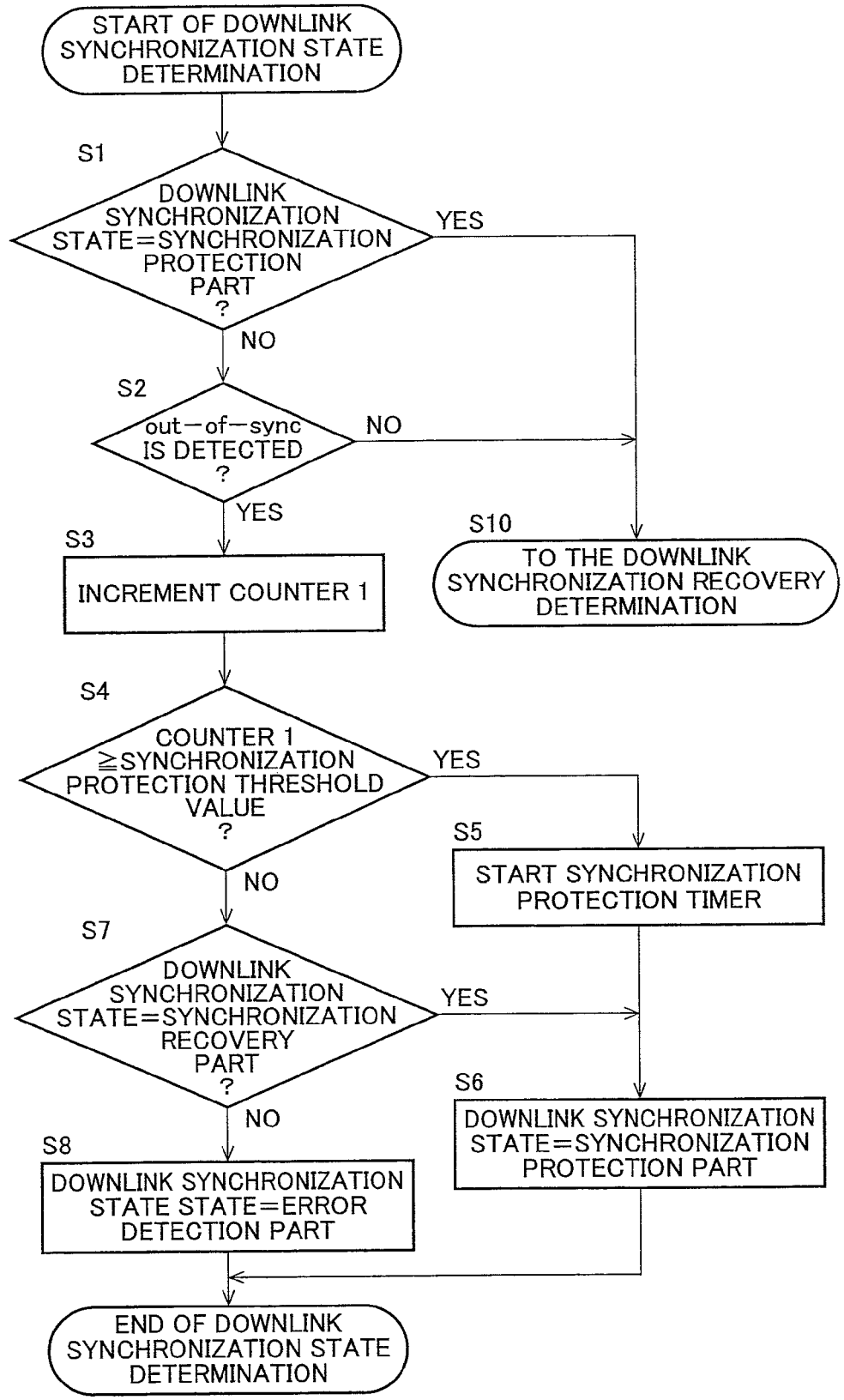
FIG. 3 is a flowchart of downlink synchronization state determination of a mobile station apparatus of the present invention.

FIG. 3 is a flowchart of downlink synchronization state determination of the mobile station apparatus. The mobile station apparatus has a counter 1 that counts the number of detections of downlink synchronization error (also referred to as Out-of-Sync), a counter 2 that counts the number of detections of downlink synchronization recovery (also referred to as In-Sync), and a synchronization protection threshold value for determining a shift to the synchronization protection part. The synchronization protection threshold value is provided through the broadcast information from the base station apparatus.

First, if the downlink synchronization state is in the synchronization protection part (step S1, YES), the determination of Out-of-Sync is not necessary and, therefore, the mobile station apparatus goes to downlink synchronization recovery determination (FIG. 4 described later) (step S10) and this flow is terminated. In the case of other than the synchronization protection part, it is determined whether Out-of-Sync is detected (step S2). If Out-of-Sync is not detected, the mobile station apparatus goes to the downlink synchronization recovery determination (step S10). If Out-of-Sync is detected and the downlink synchronization state is in other than the error detection part, the counter 1 is incremented (step S3). The counter 2 is reset at the same time. It is further determined whether the incremented counter 1 reaches the synchronization protection threshold value (step S4). If the counter 1 is equal to or greater than the synchronization protection threshold value, the mobile station apparatus determines that a radio link problem (physical later problem) occurs, and starts the timing of the synchronization protection timer (step S5). In this case, the downlink synchronization state is in the synchronization protection part and the counter 1 is reset at the same time (step S6).

On the other hand, in the case where the counter 1 is less than the synchronization protection threshold value, if the current downlink synchronization state is in the synchronization recovery part (step S7, YES), the downlink state is in the synchronization protection part (step S6) and if other than the synchronization recovery part (synchronization part or error detection part), the downlink synchronization state is in the error detection part (step S8). The counter 1 may be decremented rather than being incremented and the time point when the counter 1 turns to zero may be determined as the start of the synchronization protection part.

Figure 4:
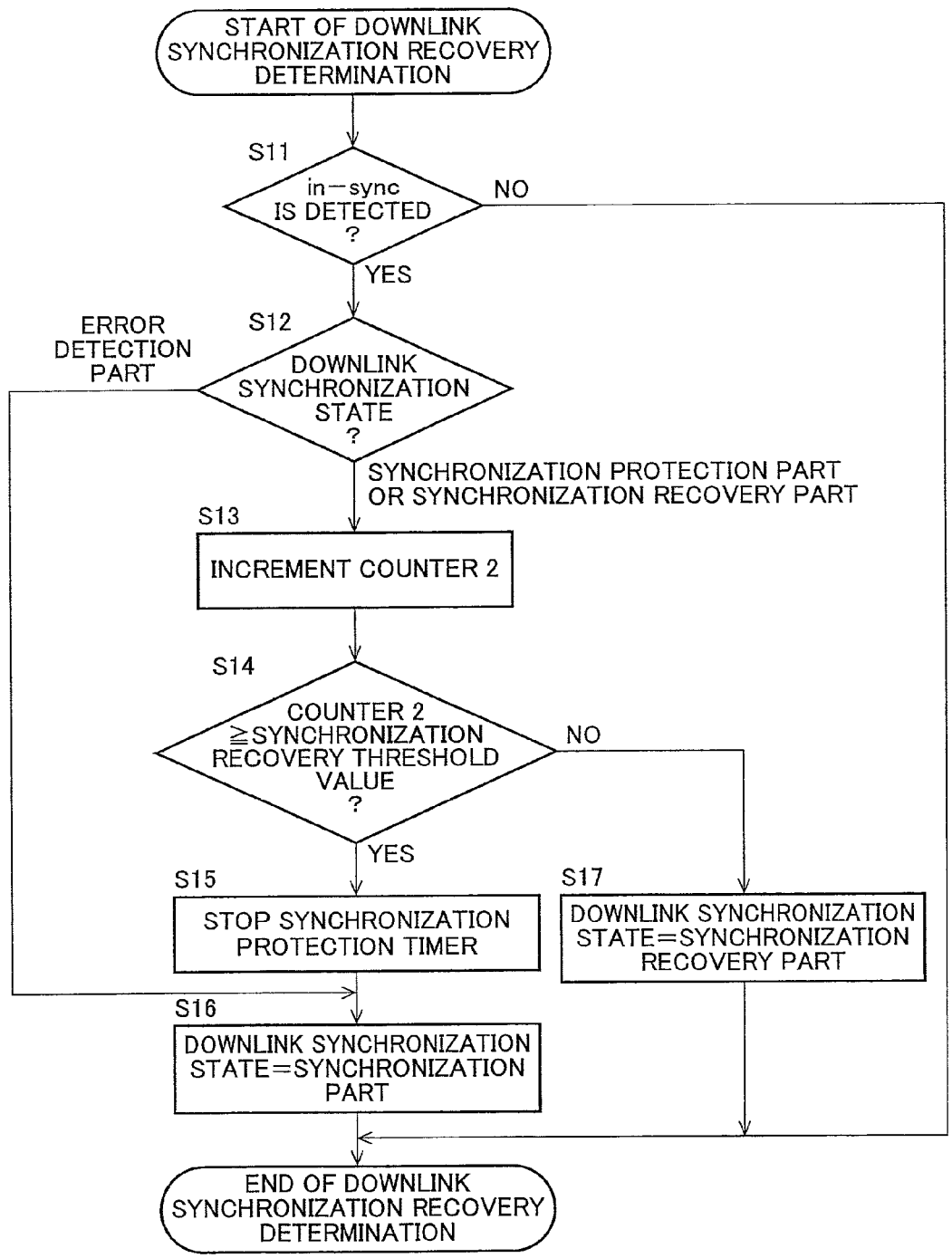
FIG. 4 is another flowchart of downlink synchronization recovery determination of a mobile station apparatus of the present invention.

FIG. 4 is another flowchart of downlink synchronization state determination of the mobile station apparatus. The mobile station apparatus starts this flow if Out-of-Sync is not detected in FIG. 3. The mobile station apparatus determines whether In-Sync is detected (step S11). If In-Sync is detected, the counter 1 is reset and, if the downlink synchronization state is in the error detection part (step S12), the mobile station apparatus determines that the downlink synchronization state is in the synchronization part, and terminates the process (step S16). If the downlink synchronization state is in the synchronization protection part or the synchronization recovery part, the counter 2 is incremented (step S13).

It is further determined whether the incremented counter 2 reaches a synchronization recovery threshold value (step S14). If the counter 2 is equal to or greater than the synchronization recovery threshold value, the mobile station apparatus determines a radio link recovery and stops the synchronization protection timer (step S15). In this case, the downlink synchronization state is in the synchronization part (step S16). On the other hand, if the counter 2 is less than the synchronization recovery threshold value, the downlink synchronization state is in the synchronization recovery part (step S17). Returning to the start of the flow, if In-Sync is not detected, it is determined that the current downlink synchronization state continues, and the process is terminated. The counter 2 may be decremented rather than being incremented and the time point when the counter 2 turns to zero may be determined as the start of the synchronization part.

First to third embodiments represent the Out-of-Sync determining method and the method of making the transition of the downlink synchronization state of the mobile station apparatus as described above. Fourth to sixth embodiments represent the In-Sync determining method and the method of making the transition of the downlink synchronization state of the mobile station apparatus as described above.

The mobile station apparatus can use a radio link synchronization determining method combining the Out-of-Sync determining method of the first embodiment or the second embodiment and the In-Sync determining method of the fourth embodiment or the fifth embodiment. The mobile station apparatus can use a radio link synchronization determining method combining the Out-of-Sync determining method of the third embodiment and the In-Sync determining method of the sixth embodiment.

The embodiments of the present invention will now specifically be described in view of the matters described above.

(First Embodiment)

The first embodiment of the present invention will hereinafter be described.

In a method described in this embodiment, a mobile station apparatus manages only one downlink synchronization state regardless of the number of received component carriers in relation to the detection of downlink synchronization error.

Figure 5:
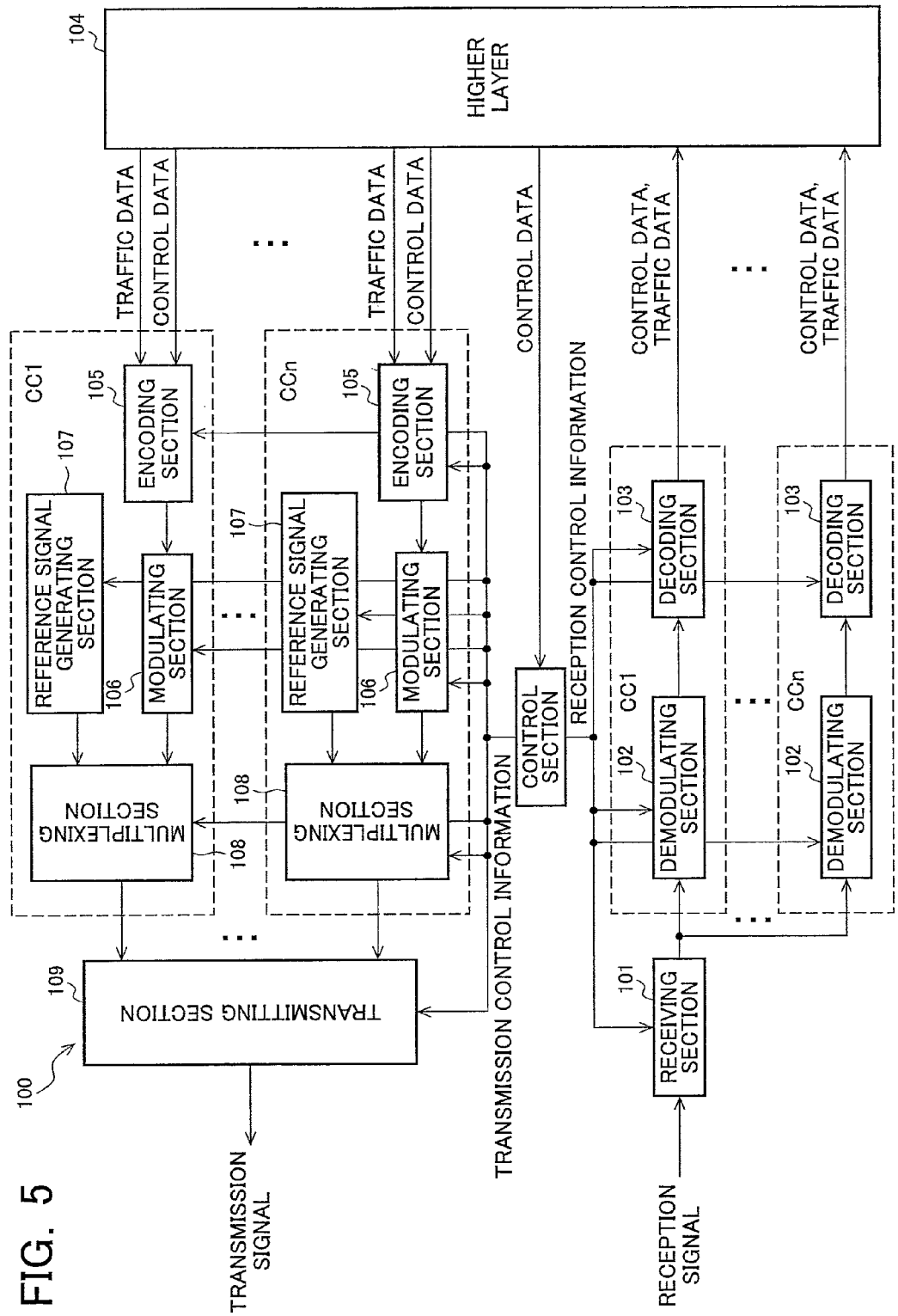
FIG. 5 is a block diagram of an example of a base station apparatus according to the present invention.

FIG. 5 is a block diagram of an example of a base station apparatus according to the first embodiment of the present invention. This base station apparatus 100 comprises of a receiving section 101, a demodulating section 102, a decoding section 103, a higher layer 104, an encoding section 105, a modulating section 106, a reference signal generating section 107, a multiplexing section 108, a transmitting section 109, and a control section 110.

The higher layer 104 inputs traffic data and a control signal to the encoding section 105 for each component carrier (CC). The encoding section 105 encodes the input data, which is input to the modulating section 106. The modulating section 106 modulates the encoded signal. The signal output from the encoding section 105 and a downlink reference signal generated by the reference signal generating section 107 are mapped to the frequency domain by the multiplexing section 108. The output signal from the multiplexing section 108 of each component carrier is input to the transmitting section 109. The transmitting section 109 converts a signal of the frequency domain into a signal of the time domain and transmits the signal on a carrier wave of a predetermined frequency by performing power amplification.

The receiving section 101 converts signals received from the mobiles station apparatus into baseband digital signals and separates the signals for each component carrier. The signal of each component carrier is input to the demodulating section 102 and demodulated. The signal demodulated by the demodulating section 102 is then input to the decoding section 103 and decoded, and correctly decoded control data and traffic data are output to the higher layer 104. Control information necessary for the control of these blocks is input from the higher layer 104 to the control section 110, and the control section 110 appropriately inputs the control information related to transmission as transmission control information to the blocks of the encoding section 105, the modulating section 106, the reference signal generating section 107, the multiplexing section 108, and the transmitting section 109, and the control information related to reception as reception control information to the blocks of the receiving section 101, the demodulating section 102, and the decoding section 103.

In FIG. 5, other constituent elements of the base station apparatus 100 are irrelevant to this embodiment and therefore not depicted.

Figure 6:
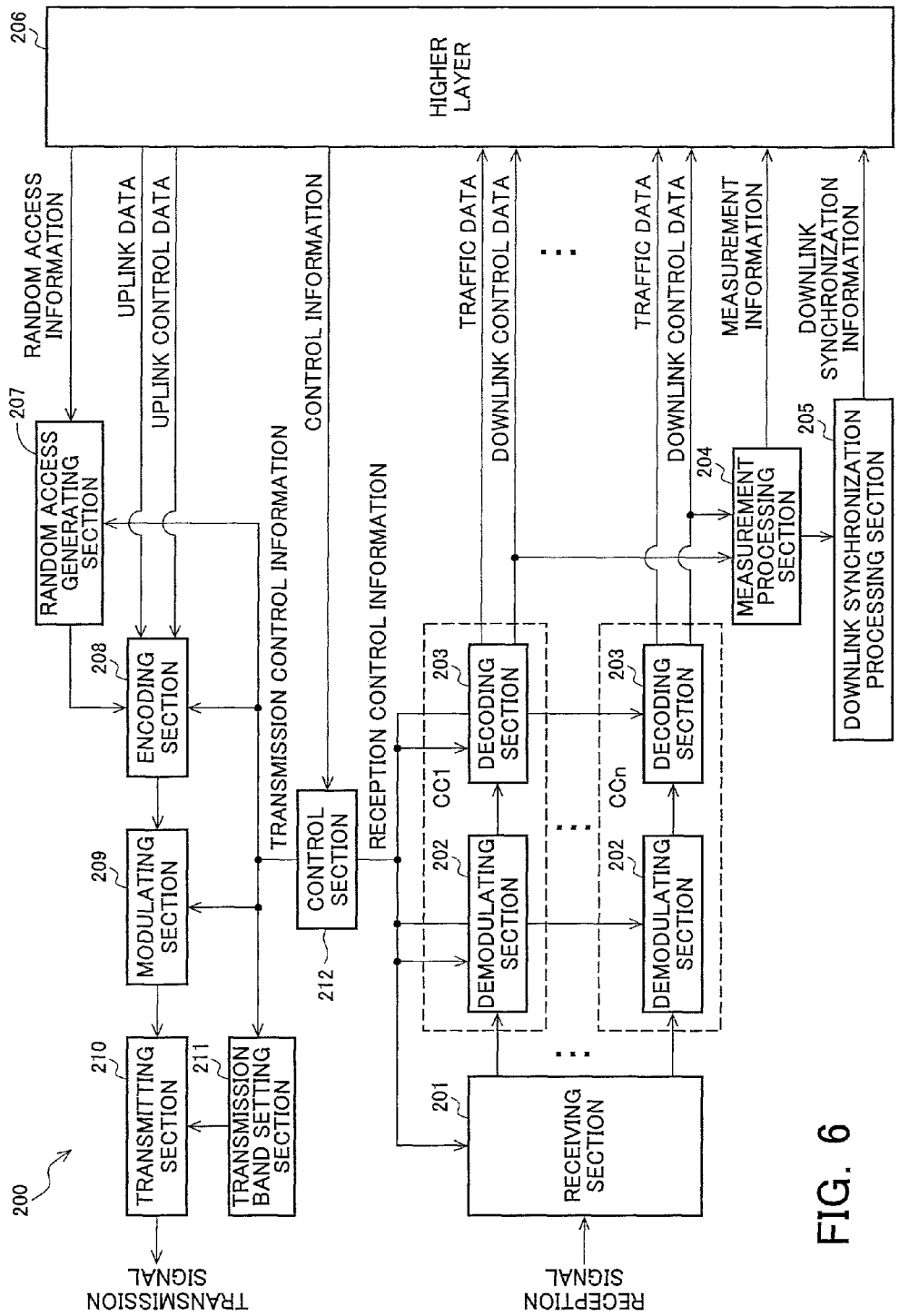
FIG. 6 is a block diagram of an example of a mobile station apparatus according to the present invention.

FIG. 6 is a block diagram of an example of a mobile station apparatus according to the first embodiment of the present invention. This mobile station apparatus 200 comprises of a receiving section 201, a demodulating section 202, a decoding section 203, a measurement processing section 204, a downlink synchronization processing section 205, a random access generating section 207, an encoding section 208, a modulating section 209, a transmitting section 210, and a transmission band setting section 211. Control information is input from a higher layer 206 to a control section 212 before reception, and control information related to reception is appropriately input as reception control information to the receiving section 201, the demodulating section 202, and the decoding section 203. The reception control information includes information of reception frequency band as well as information such as reception timing, a multiplexing method, and resource allocation information related to each channel.

A reception signal (transmission signal from the base station apparatus 100) is received by the receiving section 201. The receiving section 201 receives a signal in a frequency band specified by the reception control information. The received signal is then input to the demodulating section 202 prepared for each component carrier. The demodulating section 202 demodulates the reception signal for each component carrier and inputs the signal to the decoding section 203 to correctly decode traffic data and downlink control data, and the decoded data are input to the higher layer 206. The downlink control data is also input to the measurement processing section 204. The measurement processing section 204 calculates the reception quality of the downlink reference signal and a reception error rate of the downlink shared control channel or the downlink data channel for each cell based on measurement results and outputs the calculated results to the higher layer 206.

The measurement information is also input to the downlink synchronization processing section 205. The downlink synchronization processing section 205 compares the input measurement information with at least two threshold values specified in advance to make a determination of Out-of-Sync or In-Sync. It may be determined to be neither. The determination result is input to the higher layer. The higher layer counts the determination result to manage the downlink synchronization state of the mobile station apparatus 200 and makes a radio link synchronization determination based on the downlink synchronization state. It is noted that the determination of Out-of-Sync or In-Sync made by the downlink synchronization processing section 205 is different in each of the embodiments.

Control information is input from the higher layer 206 to the control section 212 before transmission, and control information related to transmission is appropriately input as transmission control information to the random access generating section 207, the encoding section 208, the modulating section 209, and the transmission band setting section 211. The transmission control information includes uplink scheduling information of transmission signals, i.e., encode information, modulation information, information of transmission frequency band, and information such as transmission timing, a multiplexing method, and resource allocation information related to each channel. Random access information is input to the random access generating section and random access data is generated. The random access information includes preamble information, transmission resource information, and cell ID information related to communication immediately before a downlink synchronization loss.

The higher layer 206 inputs the random access information to the random access generating section 207 when a suitable cell is reselected (at the time of cell reselection) after the downlink synchronization loss is determined. To the encoding section 208, uplink data and uplink control data are input from the higher layer 206 in addition to the random access data. The encoding section 208 appropriately encodes and outputs the data to the modulating section 209 in accordance with the transmission control information. The modulating section 209 modulates the output from the encoding section 208. The transmission band setting section 211 sets a frequency band of transmission for each of the transmitting sections 210. The transmitting section 210 maps the output of the modulating section 209 to the frequency domain, converts a signal of the frequency domain into a signal of the time domain, and transmits the signal on a carrier wave of a predetermined frequency by performing power amplification.

The number of the receiving sections 201 may be configured to be the same as the number of concurrently receivable frequency bands of the mobile station apparatus 200. In this case, some of the receiving sections 201 may not be used at the same time. The encoding section 208 and the modulating section 209 may be prepared for each component carrier. The number of the transmitting sections 210 may be configured to be the same as the number of concurrently transmittable frequency bands of the mobile station apparatus 200.

In FIG. 6, other constituent elements of the mobile station apparatus 200 are irrelevant to this embodiment and therefore not depicted.

The network configuration and the frequency band correlation same as those respectively depicted in FIGS. 1 and 2 are applicable.

Since the mobile station apparatus 200 of this embodiment has only one downlink synchronization state, consideration must be given to the case that the parameters (the synchronization protection threshold value and the synchronization protection timer) are different in each component carrier. If the synchronization protection threshold value and the synchronization protection timer are different in each component carrier, methods include (1) preferentially using values of a newly added component carrier, (2) providing values of a component carrier preferentially used from the base station apparatus 100, (3) ignoring values of a component carrier and using new values individually provided from the base station apparatus 100, and (4) selecting and using those having larger (or smaller) values. In the methods of 2 and 3, values are provided from the base station apparatus 100 to the mobile station apparatus 200 by using a control message (RRC message) for adding (changing) a component carrier.

Figure 7:
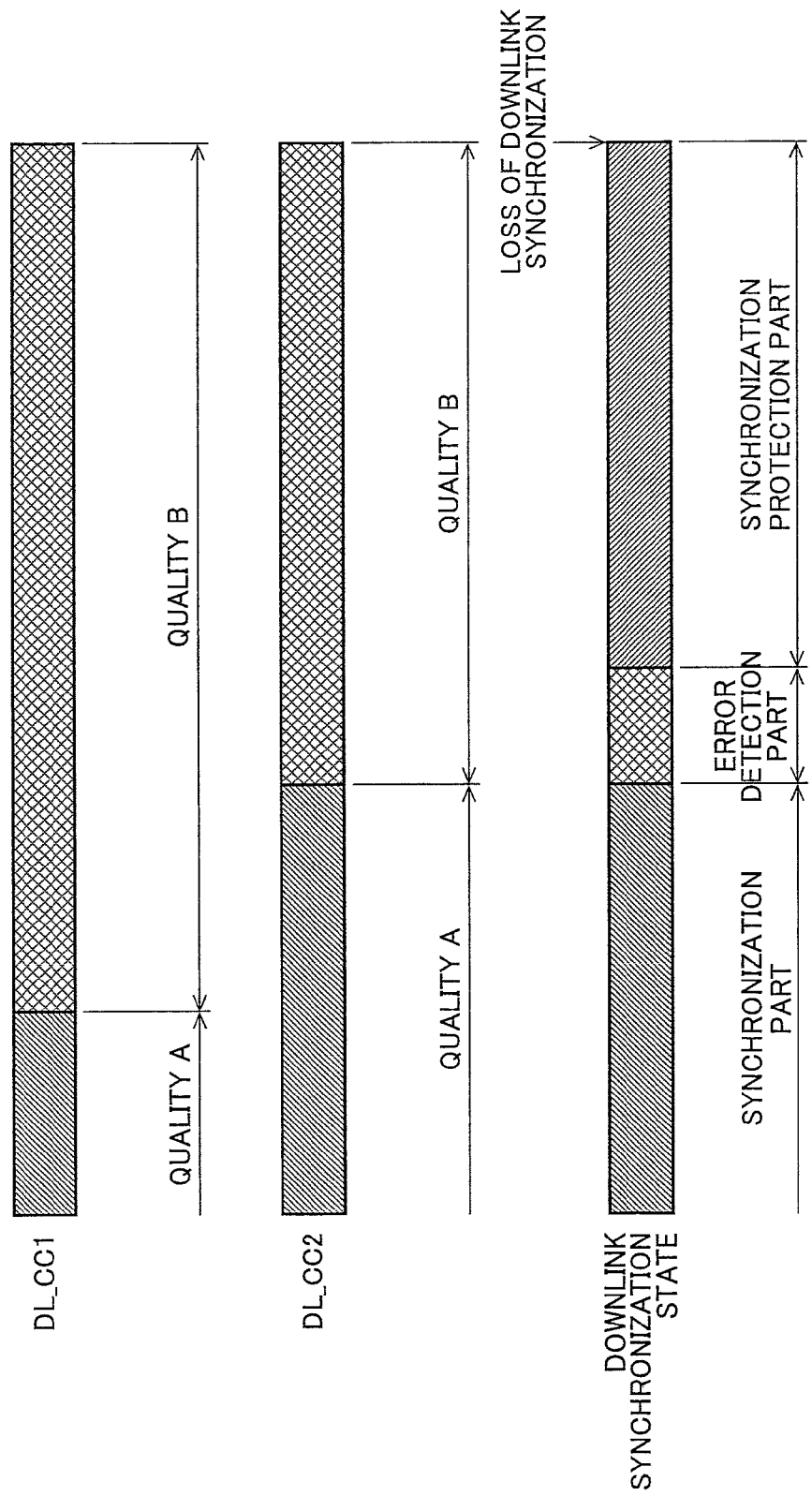
FIG. 7 is a diagram of a method of determining a downlink synchronization error and a method of managing a downlink synchronization state according to a first embodiment of the present invention.
Figure 8:
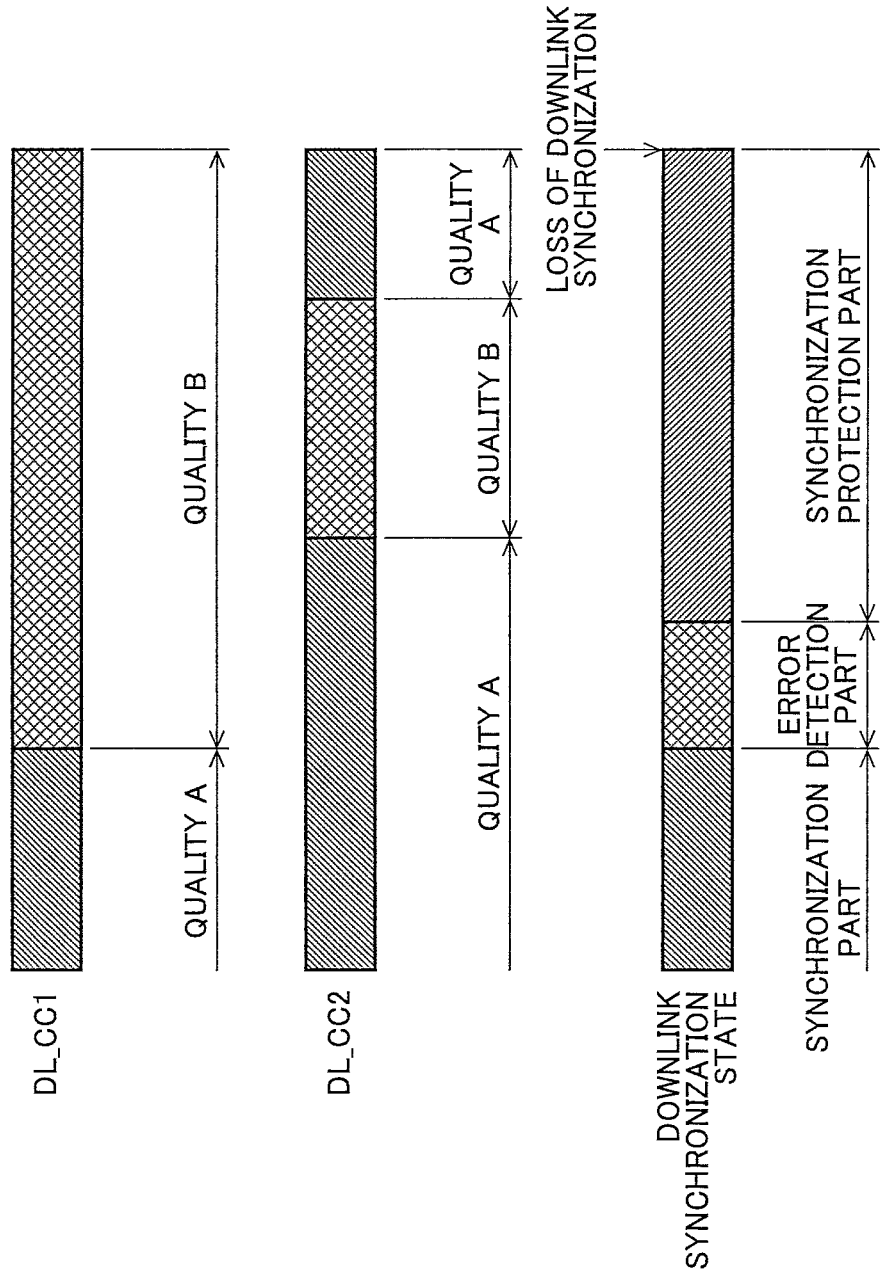
FIG. 8 is another diagram of the method of determining a downlink synchronization error and the method of managing a downlink synchronization state according to the first embodiment of the present invention.
Figure 9:
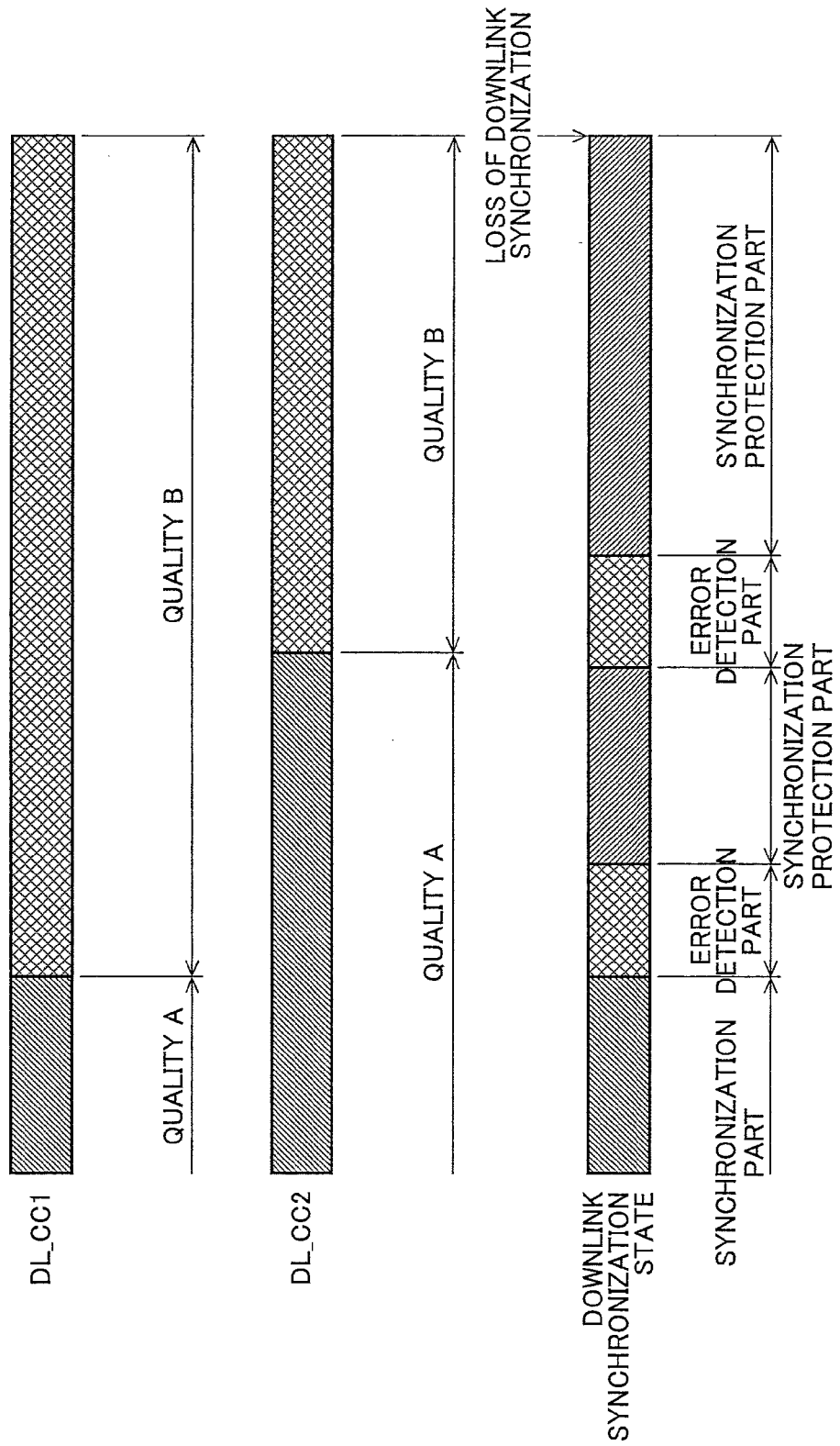
FIG. 9 is a further diagram of the method of determining a downlink synchronization error and the method of managing a downlink synchronization state according to the first embodiment of the present invention.

With regard to a radio link synchronization determining method of the mobile station apparatus 200 that receives a plurality of downlink frequency bands (component carriers) through the carrier aggregation, an Out-of-Sync detecting method necessary for performing the downlink synchronization determination depicted in FIG. 3 will be described with reference to FIGS. 7 to 9. In FIGS. 7 to 9, quality A represents a state of reception quality better than a threshold value 1 and, in contrast, quality B represents a state of reception quality worse than the threshold value 1. The threshold value 1 (also referred to as Qout) for determining the quality A and the quality B is arbitrarily determined by the mobile station apparatus 200 and the different threshold value 1 can be set for each component carrier. The threshold value 1 (Qout) corresponds to a downlink synchronization error determining threshold value of the present invention for determining a downlink synchronization error. The same applies to the embodiments described below.

For example, Qout may be determined from a reception error rate of the downlink shared control channel (BER (Bit Error Rate), BLER (Block Error Rate)) or may be determined from reception quality of the downlink reference signal (EU-TRA Carrier RSSI (Received Signal Strength Indicator), RSRP (Reference Signal Received Power), RSRQ (Reference Signal Received Quality), path-loss. It is desirable to use a value acquired by averaging a plurality of measurement values as the reception quality compared with Qout to improve the Out-of-Sync detection accuracy, rather than using an instantaneous value.

FIG. 7 depicts a method of measuring reception quality of each component carrier and managing the downlink synchronization state by comprehensively determining the reception quality of each component carrier in the mobile station apparatus 200 that receives a plurality of downlink frequency bands through the carrier aggregation. DL_CC1 and DL_CC2 in FIG. 7 denote different component carriers received by the mobile station apparatus 200.

When the reception quality falls below the threshold value 1 (Qout) in all the component carriers being received, the mobile station apparatus 200 determines a downlink synchronization error and makes a transition of the downlink synchronization state to the error detection part. If the downlink synchronization error is consecutively determined for a certain number of times, the mobile station apparatus 200 makes a transition of the downlink synchronization state to the synchronization protection part, stops the transmission through the uplink component carriers corresponding to all the component carriers being received, and starts the downlink synchronization protection timer at the same time. If the downlink synchronization does not recover until the expiration of the downlink synchronization protection timer, the mobile station apparatus 200 determines a downlink synchronization loss, releases individually specified radio resources, and then starts the cell reselection.

In the example of FIG. 7, the mobile station apparatus 200 individually compares the reception qualities of the component carriers (DL_CC1, DL_CC2) with the threshold value 1 (Qout) and determines the downlink synchronization error when both DL_CC1 and DL_CC2 turn to the quality B.

FIG. 8 is a variation of FIG. 7 and depicts a method of measuring reception quality of each of component carriers and managing the downlink synchronization state based on the reception quality of any one of the component carriers in the mobile station apparatus 200 that receives a plurality of downlink frequency bands through the carrier aggregation. DL_CC1 and DL_CC2 in FIG. 8 denote different component carriers received by the mobile station apparatus 200. When the reception quality falls below the threshold value 1 (Qout) in any one of the component carriers being received, the mobile station apparatus 200 determines a downlink synchronization error and makes a transition of the downlink synchronization state to the error detection part.

If the downlink synchronization error is consecutively determined for a certain number of times, the mobile station apparatus 200 makes a transition of the downlink synchronization state to the synchronization protection part, starts the downlink synchronization protection timer at the same time, and stops the transmission through the uplink component carriers corresponding to all the component carriers being received. If the downlink synchronization does not recover until the expiration of the downlink synchronization protection timer, the mobile station apparatus 200 determines a downlink synchronization loss, releases individually specified radio resources, and then initiates the cell reselection.

In the example of FIG. 8, the mobile station apparatus 200 individually compares the reception qualities of the component carriers (DL_CC1, DL_CC2) with the threshold value 1 (Qout) and determines the downlink synchronization error when DL_CC1 turns to the quality B. Even when DL_CC2 turns to the quality A, the determination of the downlink synchronization state is not affected since DL_CC1 has the quality B.

FIG. 9 is another variation of FIG. 7 and depicts a method of measuring reception quality of each of component carriers and managing the downlink synchronization state based on the latest change in reception quality among the component carriers in the mobile station apparatus 200 that receives a plurality of downlink frequency bands through the carrier aggregation. DL_CC1 and DL_CC2 in FIG. 9 denote different component carriers received by the mobile station apparatus 200. When the reception quality falls below the threshold value 1 (Qout) in any one of the component carriers being received, the mobile station apparatus 200 determines a downlink synchronization error and makes a transition of the downlink synchronization state to the error detection part.

If the downlink synchronization error is consecutively determined for a certain number of times, the mobile station apparatus 200 makes a transition of the downlink synchronization state to the synchronization protection part, starts the downlink synchronization protection timer at the same time, and stops the transmission through the uplink component carriers corresponding to all the component carriers being received. If the downlink synchronization does not recover until the expiration of the downlink synchronization protection timer, the mobile station apparatus 200 determines a downlink synchronization loss, releases individually specified radio resources, and then initiates the cell reselection. When the reception quality falls below the threshold value 1 (Qout) in another component carrier during the error detection part or the synchronization protection part, the mobile station apparatus 200 resets the number of previous detections of the downlink synchronization error.

In the example of FIG. 9, the mobile station apparatus 200 individually compares the reception qualities of the component carriers (DL_CC1, DL_CC2) with the threshold value 1 (Qout) and determines the downlink synchronization error when DL_CC1 turns to the quality B. If another component carrier (DL_CC2 in FIG. 9) turns to the quality B before a downlink synchronization loss is determined, a transition of the downlink synchronization state is made again to the error detection part.

If not in the carrier aggregation state, the mobile station apparatus 200 can directly apply the conventional downlink synchronization error determination.

When a downlink synchronization loss is determined and the downlink synchronization state is in the reconnection part, the mobile station apparatus 200 initiates the random access procedure for reconnection request after the cell reselection and transmits a random access channel to the base station apparatus 100 selected by the cell reselection. When receiving a response to the random access channel from the base station apparatus 100, the mobile station apparatus 200 transmits the cell ID of the base station apparatus 100 in communication before the downlink synchronization loss and the mobile station apparatus ID of its own (also referred to as C-RNTI, Cell-Radio Network Temporary Identifier) to the base station apparatus 100 selected by the cell reselection so as to subsequently resume the interrupted data reception. The cell ID transmitted by the mobile station apparatus 200 can be implemented by using any one of (1) cell IDs of all the component carriers, (2) arbitrarily selected one of cell IDs of component carriers, (3) a cell ID of the highest-priority component carrier specified by broadcast information, and (4) a cell ID (carrier aggregation ID) newly allocated to the mobile station apparatus 200 in carrier aggregation.

The mobile station apparatus ID transmitted by the mobile station apparatus 200 is transmitted as the mobile station apparatus ID allocated for the cell IDs of component carriers transmitted in 1 to 4 described above. Therefore, in the case of the method of 1 described above where cell IDs of all the component carriers are transmitted, the number of mobile station apparatus IDs equal to that of component carriers must be transmitted. The same mobile station apparatus ID may be allocated for all the component carriers.

The base station apparatus 100 determines the data destined for the mobile station apparatus interrupted due to the occurrence of a loss of the downlink synchronization from the cell ID and the mobile station apparatus ID and resumes the interrupted data transmission to the mobile station apparatus 200.

Since this embodiment eliminates the need of the mobile station apparatus 200 to manage the downlink synchronization state for each component carrier even in the carrier aggregation, the control is simplified and power consumption is reduced. The mobile station apparatus 200 can use the common control of the downlink synchronization error determination in both within the carrier aggregation and without the carrier aggregation, and thereby increase in hardware circuit size or memory capacity used by software is suppressed.

(Second Embodiment)

In the method described in the first embodiment, only one downlink synchronization state is managed by the mobile station apparatus 200 regardless of the number of received component carriers in relation to the detection of downlink synchronization error. However, the mobile station apparatus 200 needs to determine the reception quality of all the component carriers being received to determine the downlink synchronization error, and comprehensively evaluate the result. Therefore, with the mobile station apparatus 200 according to a second embodiment, a method of managing the downlink synchronization state based on reception quality of one certain component carrier will be described.

The base station apparatus 100 used in this embodiment may be the same as FIG. 5. The mobile station apparatus 200 may be the same as FIG. 6. To the correspondence relation between the network configuration and the correlation of frequency bands, the similar relation depicted respectively in FIGS. 1 and 2 are applicable.

Figure 10:
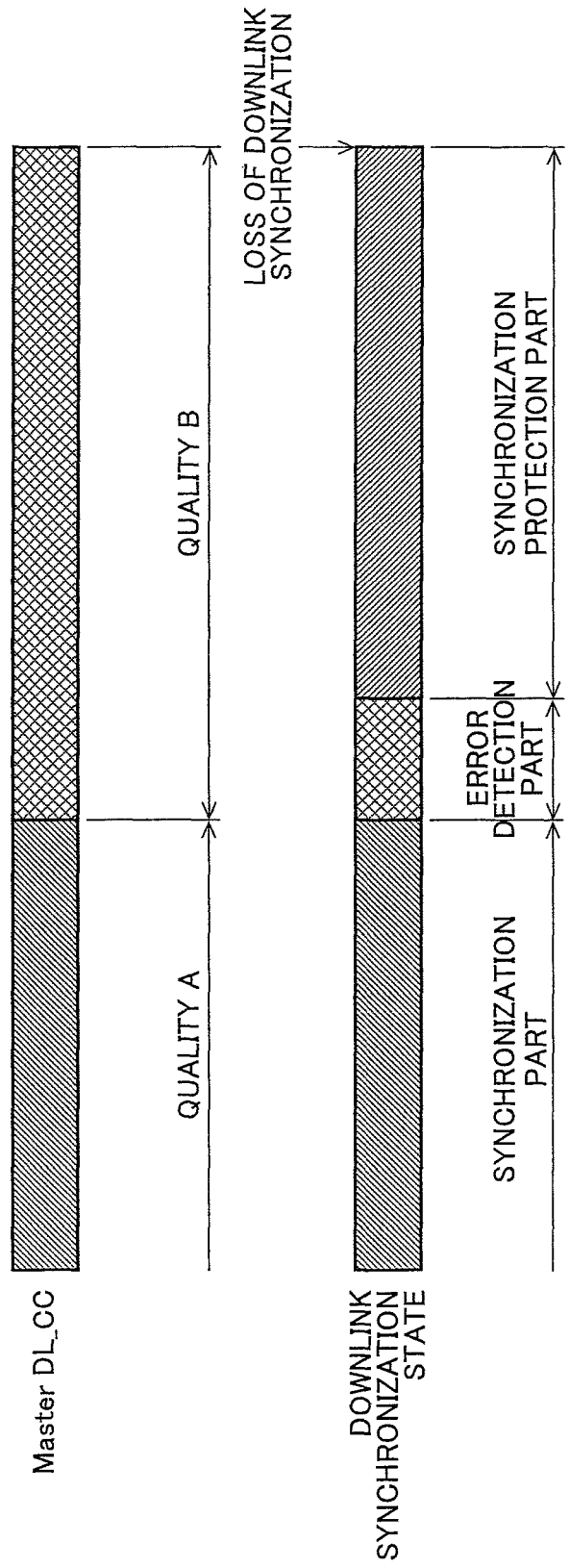
FIG. 10 is a diagram of a method of determining a downlink synchronization error and a method of managing a downlink synchronization state according to a second embodiment of the present invention.

FIG. 10 depicts a method of measuring reception quality of one component carrier (hereinafter, a master component carrier) determined based on any one of the methods described later and managing the downlink synchronization state based on the reception quality of the master component carrier in the mobile station apparatus 200 that receives a plurality of downlink frequency bands through the carrier aggregation. Therefore, the mobile station apparatus 200 need to perform the downlink synchronization state determination depicted in FIG. 3 for the master component carrier. Master DL_CC of FIG. 10 denotes the master component carrier received by the mobile station apparatus 200. The quality A and the quality B depicted in FIG. 10 have the same meanings as the first embodiment and therefore will not be described.

When the reception quality falls below the threshold value 1 (Qout) in the master component carrier, the mobile station apparatus 200 determines a downlink synchronization error and makes a transition of the downlink synchronization state to the error detection part. If the downlink synchronization error is consecutively determined for a certain number of times, the mobile station apparatus 200 makes a transition of the downlink synchronization state to the synchronization protection part, starts the downlink synchronization protection timer at the same time, and stops the transmission through the uplink component carriers corresponding to all the component carriers being received. If the downlink synchronization of the component carrier does not recover until the expiration of the downlink synchronization protection timer, the mobile station apparatus 200 determines a loss of downlink synchronization, releases individually specified radio resources, and then initiates the cell reselection.

In the example of FIG. 10, the mobile station apparatus 200 compares the reception quality of the master component carrier (Master DL_CC) with the threshold value 1 (Qout) and determines the downlink synchronization error when the master component carrier turns to the quality B.

If not in the carrier aggregation state, the mobile station apparatus 200 can directly apply the conventional downlink synchronization error determination.

Methods of determining the master component carrier by the mobile station apparatus 200 include (1) individually specifying the master component carrier for the mobile station apparatus 200 by the base station apparatus 100 using an RRC message, (2) selecting the highest-priority component carrier included in broadcast information, (3) selecting the component carrier that is the oldest (having a longer reception time), and (4) selecting the component carrier that is the newest (having a shorter reception time). Alternatively, an arbitrary component carrier may be selected at the discretion of the mobile station apparatus 200 from the component carriers received by the mobile station apparatus 200. For example, the mobile station apparatus 200 may select the component carrier having the best reception quality from component carriers having reception quality higher than a threshold value for a certain period of time.

When a loss of downlink synchronization is determined and the downlink synchronization state is in the reconnection part, the mobile station apparatus 200 initiates the random access procedure for reconnection request after the cell reselection and transmits a random access channel to the base station apparatus 100 selected by the cell reselection. When receiving a response to the random access channel from the base station apparatus 100, the mobile station apparatus 200 transmits the cell ID of the base station apparatus 100 in communication before the loss of downlink synchronization and the mobile station apparatus ID of its own to the base station apparatus 100 selected by the cell reselection so as to subsequently resume the interrupted data reception. The cell ID transmitted by the mobile station apparatus 200 can be implemented by using one of the methods, which are (1) cell IDs of all the component carriers, (2) arbitrarily selected one of cell IDs of component carriers, (3) a cell ID of the highest-priority component carrier specified by broadcast information, (4) a cell ID (carrier aggregation ID) newly allocated to the mobile station apparatus 200 in carrier aggregation, and (5) the cell ID of the master component carrier.

The mobile station apparatus ID transmitted by the mobile station apparatus 200 is transmitted as the mobile station apparatus ID allocated for the cell IDs of component carriers transmitted in (1) to (5) described above. Therefore, in the case of the method of (1) described above where cell IDs of all the component carriers are transmitted, the number of mobile station apparatus IDs equal to that of component carriers are transmitted to the base station apparatus 100 selected by the cell reselection. The same mobile station apparatus ID may be allocated for all the component carriers.

The base station apparatus 100 determines the data destined for the mobile station apparatus interrupted due to the occurrence of the loss of downlink synchronization from the cell ID and the mobile station apparatus ID and resumes the interrupted data transmission to the mobile station apparatus 200.

Since this embodiment enables the mobile station apparatus 200 to manage the downlink synchronization state only for the master component carrier in the carrier aggregation and to use the same conventional control even if a parameter related to the downlink synchronization error determination is individually specified for each component carrier in addition to the effect of the first embodiment, the control is further simplified and power consumption is reduced.

(Third Embodiment)

In the method described in the first or second embodiment, only one downlink synchronization state is managed by the mobile station apparatus 200 regardless of the received component carriers in relation to the detection of downlink synchronization error. However, if the propagation characteristics of the component carriers are significantly different, the mobile station apparatus 200 may better control a plurality of downlink synchronization states for respective component carriers. Therefore, in a method described in a third embodiment, the mobile station apparatus 200 manages a downlink synchronization state for each component carrier.

The base station apparatus 100 used in this embodiment may be the same as FIG. 5. The mobile station apparatus 200 may be the same as FIG. 6. To the correspondence relation between the network configuration and the frequency bands, the same relations depicted in FIGS. 1 and 2 are applicable. The mobile station apparatus 200 manages the same number of CC downlink synchronization states indicative of downlink synchronization states of respective component carriers as the number of component carriers being received.

Figure 11:
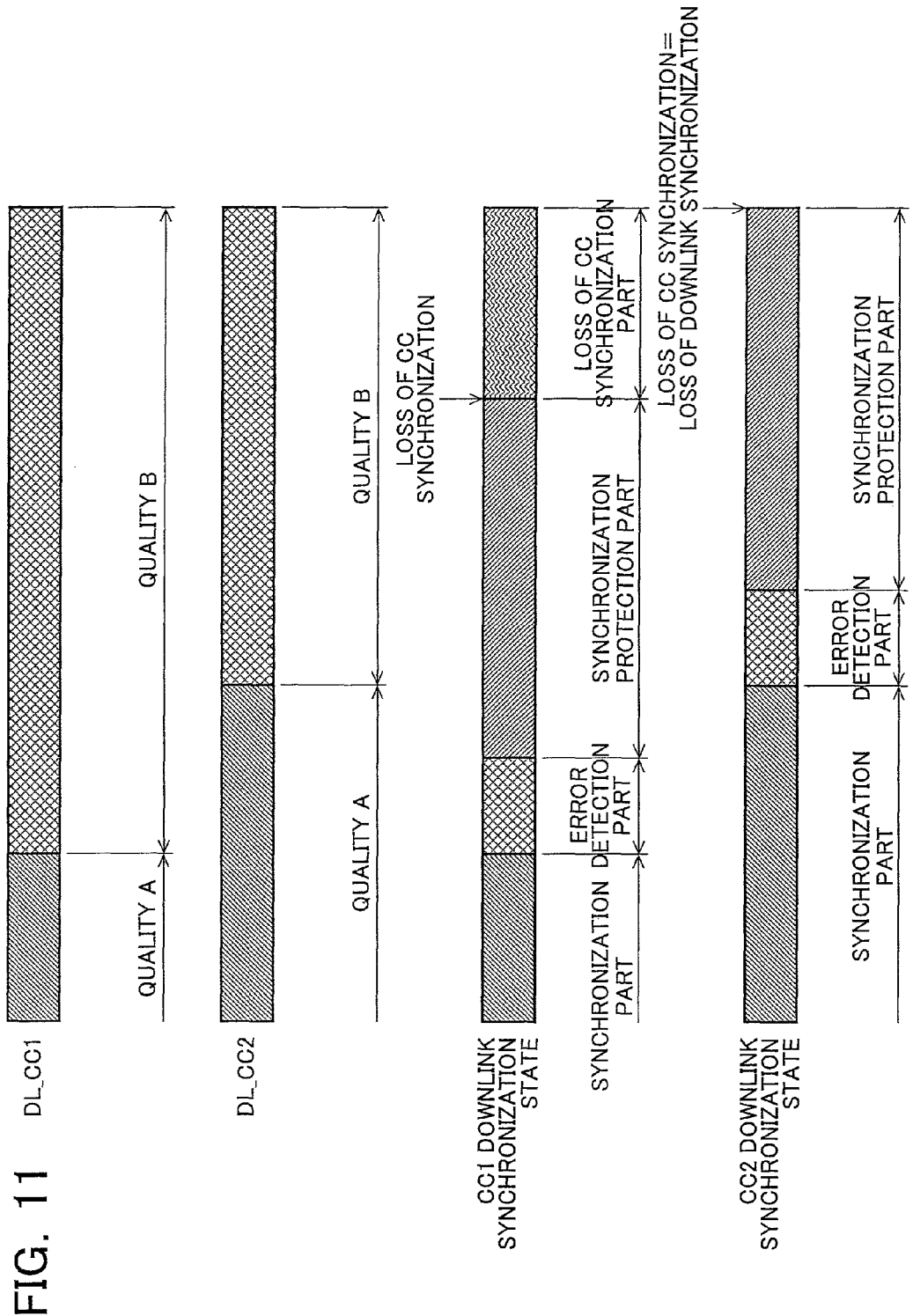
FIG. 11 is a diagram of a method of determining a downlink synchronization error and a method of managing a downlink synchronization state according to a third embodiment of the present invention.

FIG. 11 depicts a method which the mobile station apparatus 200 measures reception quality for each of component carriers, manages a CC downlink synchronization state for each of the component carriers, and further manages the downlink synchronization state based on the CC downlink synchronization states in the mobile station apparatus 200 that receives a plurality of downlink frequency bands through the carrier aggregation. Therefore, the mobile station apparatus 200 needs to individually perform the downlink synchronization state determination depicted in FIG. 3 for a plurality of component carriers. DL_CC1 and DL_CC2 in FIG. 11 denote different component carriers received by the mobile station apparatus 200. A CC1 downlink synchronization state is a downlink synchronization state corresponding to the reception quality of DL_CC1 and a CC2 downlink synchronization state is a downlink synchronization state corresponding to the reception quality of DL_CC2. The quality A and the quality B depicted in FIG. 11 have the same meanings as the first embodiment and therefore will not be described.

When the reception quality falls below the threshold value 1 (Qout) in a component carrier being received, the mobile station apparatus 200 determines a downlink synchronization error and makes a transition of the corresponding CC downlink synchronization state to the error detection part. If the downlink synchronization error is consecutively determined for a certain number of times, the mobile station apparatus 200 makes a transition of the corresponding CC downlink synchronization state to the synchronization protection part, starts the corresponding downlink synchronization protection timer at the same time, and stops the transmission through the uplink component carrier corresponding to the component carrier having the CC downlink synchronization state transited to the synchronization protection part. However, if the mobile station apparatus 200 receives another component carrier corresponding to the uplink component carrier, the transmission may not be stopped until transitions of the CC downlink synchronization states of all the other component carriers are made to the synchronization protection part. If the downlink synchronization of the corresponding component carrier does not recover until the expiration of the downlink synchronization protection timer, the mobile station apparatus 200 determines a loss of CC downlink synchronization of the component carrier and makes a transition of the downlink synchronization state to a CC synchronization loss part. When all the CC downlink synchronization states are transited to the CC synchronization loss part, the mobile station apparatus 200 determines a loss of downlink synchronization, releases individually specified radio resources, and then initiates the cell reselection.

In the example of FIG. 11, the mobile station apparatus 200 individually compares the reception quality of each component carrier (DL_CC1, DL_CC2) with the threshold value 1

(Qout) and determines the downlink synchronization error of each of the component carriers when each component carrier turns to the quality B. The mobile station apparatus 200 does not determine a loss of downlink synchronization even when the CC1 downlink synchronization state turns to the CC synchronization loss, and determines a loss of downlink synchronization when a transition of the CC2 downlink synchronization state is made to the part of a loss of CC synchronization after the transition of the CC1 downlink synchronization state is made to the part of a loss of CC synchronization.

If not in the carrier aggregation state, the mobile station apparatus 200 can directly apply the conventional downlink synchronization error determination.

If reception quality of a component carrier before determined as a loss of CC synchronization is measured as measurement at the same frequency, the mobile station apparatus 200 considers and continues the measurement as measurement at a different frequency after a loss of CC synchronization. Therefore, the mobile station apparatus 200 changes an offset value applied to the component carrier from an offset value for the measurement at the same frequency to an offset value for the measurement at a different frequency after a loss of CC synchronization.

When a loss of downlink synchronization is determined and the downlink synchronization state is in the reconnection part, the mobile station apparatus 200 initiates the random access procedure for reconnection request after the cell reselection and transmits a random access channel to the base station apparatus 100 selected by the cell reselection. When receiving a response to the random access channel from the base station apparatus 100, the mobile station apparatus 200 transmits the cell ID of the base station apparatus 100 in communication before a loss of downlink synchronization and the mobile station apparatus ID of its own to the base station apparatus 100 selected by the cell reselection so as to subsequently resume the interrupted data reception. The cell ID transmitted by the mobile station apparatus 200 can be implemented by using any one of (1) cell IDs of all the component carriers, (2) arbitrarily selected one of cell IDs of component carriers, (3) a cell ID of the highest-priority component carrier specified by broadcast information, and (4) a cell ID (carrier aggregation ID) newly allocated to the mobile station apparatus 200 in carrier aggregation.

The mobile station apparatus ID transmitted by the mobile station apparatus 200 is transmitted as the mobile station apparatus ID allocated for the cell IDs of component carriers transmitted in (1) to (4) described above. Therefore, in the case of the method of (1) described above where cell IDs of all the component carriers are transmitted, the mobile station apparatus 200 transmits the number of mobile station apparatus IDs equal to that of component carriers to the base station apparatus 100 selected by the cell reselection. The same mobile station apparatus ID may be allocated for all the component carriers.

The base station apparatus 100 determines the data destined for the mobile station apparatus interrupted due to the occurrence of a loss of downlink synchronization from the cell ID and the mobile station apparatus ID and resumes the interrupted data transmission to the mobile station apparatus 200.

In this embodiment, the mobile station apparatus 200 manages the downlink synchronization state in the carrier aggregation for each component carrier to enable the base station apparatus 100 to control suitable downlink synchronization error determination for each component carrier and the occurrence of unnecessary loss of downlink synchronization can be suppressed, thereby improving communication quality.

(Fourth Embodiment)

A fourth embodiment of the present invention will hereinafter be described.

In a method described in this embodiment, the mobile station apparatus 200 manages only one downlink synchronization state regardless of the number of received component carriers in relation to the detection of downlink synchronization recovery. Although the fourth embodiment is preferably combined with the downlink synchronization error determination of the first or second embodiment, the fourth embodiment can be combined with another downlink synchronization determination.

The base station apparatus 100 used in this embodiment may be the same as FIG. 5. The mobile station apparatus 200 may be the same as FIG. 6. The network configuration and the correlation of frequency bands same as those respectively depicted in FIGS. 1 and 2 are applicable.

Since the mobile station apparatus 200 of this embodiment has only one downlink synchronization state, consideration need to be given to the case that the parameters (the synchronization protection threshold value and the synchronization protection timer) are different in each component carrier. If the synchronization protection threshold value and the synchronization protection timer are different in each component carrier, one of the methods of the first embodiment is used as a method of determining the parameters.

Figure 12:
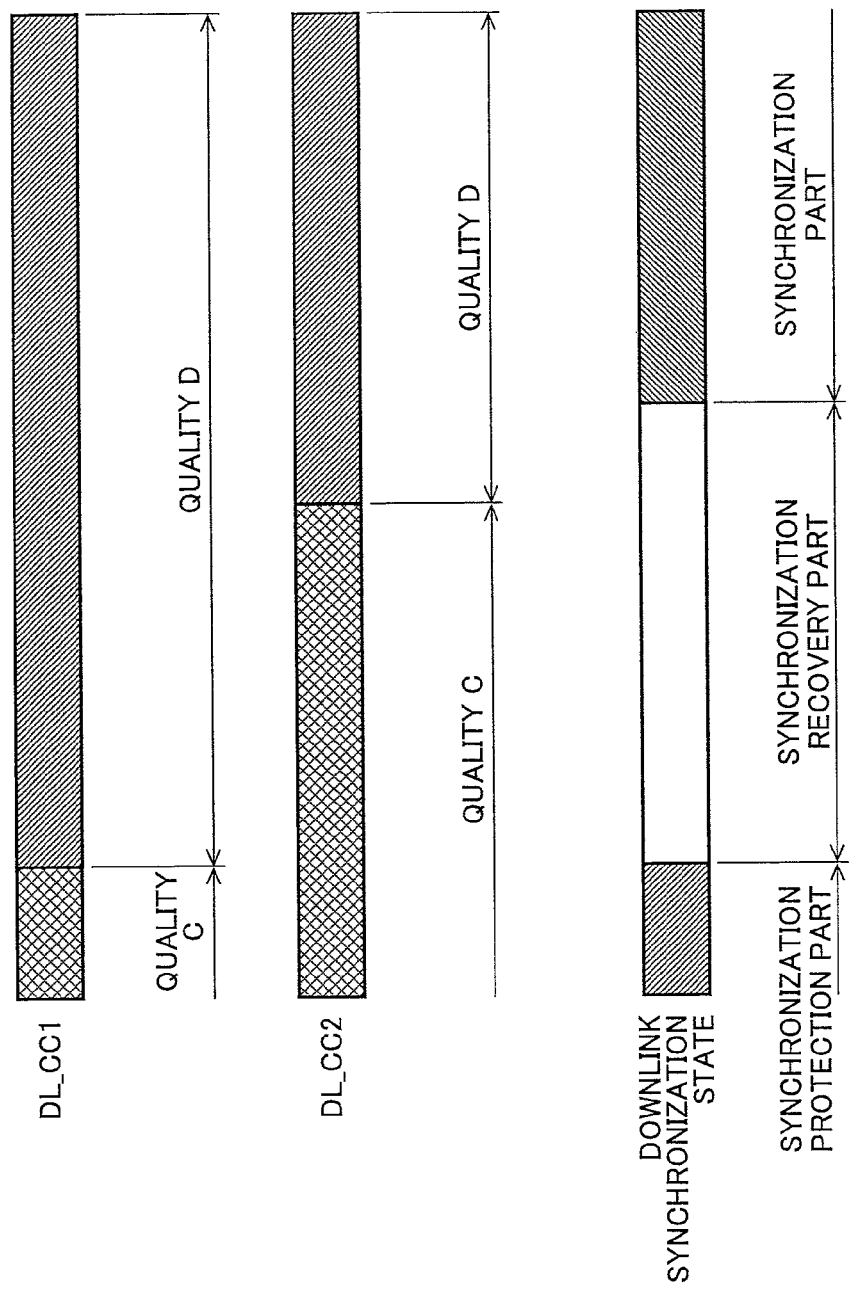
FIG. 12 is a diagram of a method of determining a downlink synchronization recovery and a method of managing a downlink synchronization state according to a fourth embodiment of the present invention.
Figure 13:
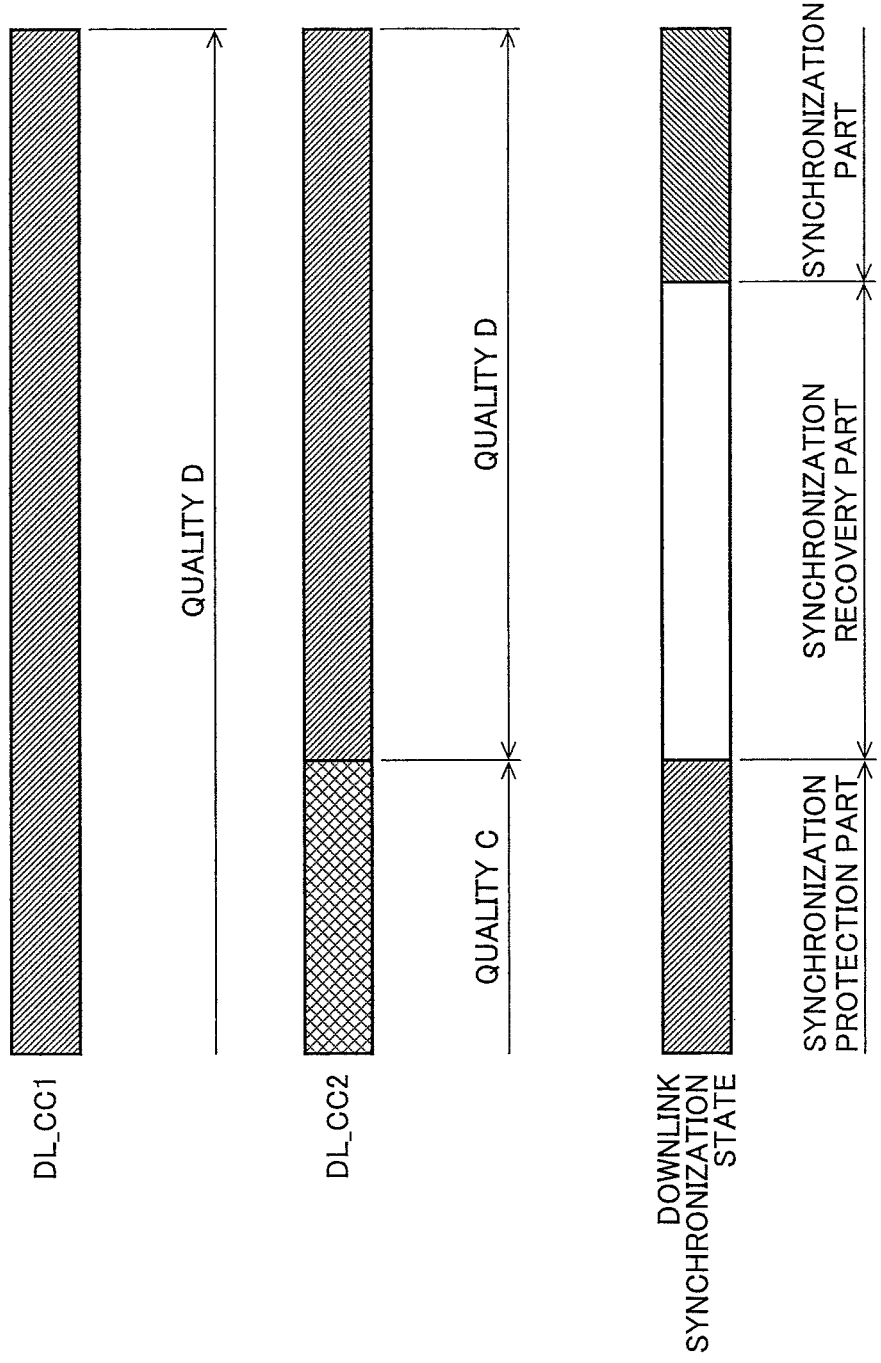
FIG. 13 is another diagram of the method of determining a downlink synchronization recovery and the method of managing a downlink synchronization state according to the fourth embodiment of the present invention.
Figure 14:
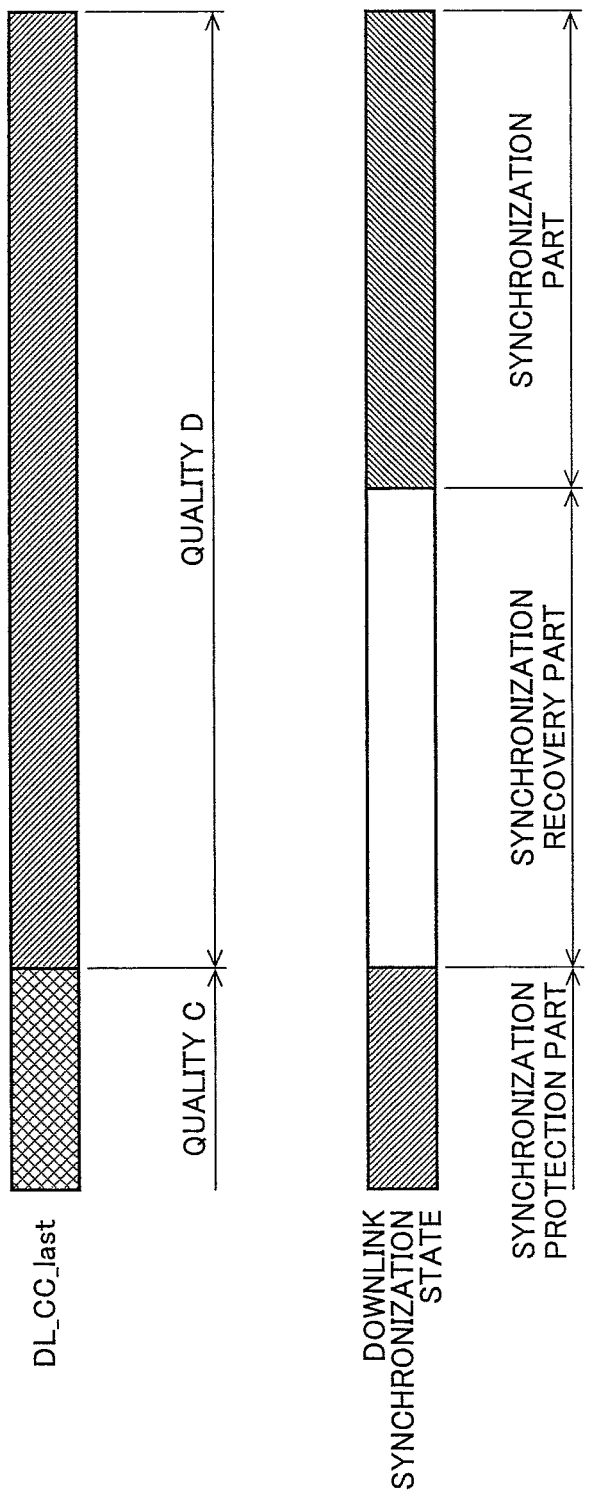
FIG. 14 is a further diagram of the method of determining a downlink synchronization recovery and the method of managing a downlink synchronization state according to the fourth embodiment of the present invention.

With regard to the radio link synchronization determining method of the mobile station apparatus 200 that receives a plurality of downlink frequency bands (component carriers) through the carrier aggregation, a method of determining the downlink synchronization recovery (also referred to as In-Sync) will be described with reference to FIGS. 12 to 14. In FIGS. 12 to 14, quality C represents a state of reception quality worse than a threshold value 2 and, in contrast, quality D represents a state of reception quality better than the threshold value 2. The threshold value 2 (also referred to as Qin) for determining the quality C and the quality D is arbitrarily determined by the mobile station apparatus 200 and the different threshold value 2 can be set for each component carrier. The threshold value 2 (Qin) corresponds to a downlink synchronization recovery determining threshold value of the present invention for determining a downlink synchronization recovery. The same applies to the embodiments described below.

For example, Qin may be determined from a reception error rate of the downlink shared control channel (BER (Bit Error Rate), BLER (Block Error Rate)) or may be determined from reception quality of the downlink reference signal (EU-TRA Carrier RSSI (Received Signal Strength Indicator), RSRP (Reference Signal Received Power), RSRQ (Reference Signal Received Quality), path-loss. Qin must be set as a value equal to or greater than Qout and must not be set as a value less than Qout. It is desirable to use a value acquired by averaging a plurality of measurement values as the reception quality compared with Qin to improve the In-Sync detection accuracy, rather than using an instantaneous value.

FIG. 12 depicts a method of measuring reception quality of each of component carriers and managing the downlink synchronization state based on the reception quality of any one of the component carriers in the mobile station apparatus 200 that receives a plurality of downlink frequency bands through the carrier aggregation. DL_CC1 and DL_CC2 in FIG. 12 denote different component carriers received by the mobile station apparatus 200. When the reception quality exceeds the threshold value 2 (Qin) in any component carrier being received, the mobile station apparatus 200 determines a downlink synchronization recovery and makes a transition of the downlink synchronization state to the synchronization recovery part. If the downlink synchronization recovery is consecutively determined for a certain number of times, the mobile station apparatus 200 makes a transition of the downlink synchronization state to the synchronization part, stops the downlink synchronization protection timer at the same time, and cancels the suspension of the transmission to the uplink component carriers.

In the example of FIG. 12, the mobile station apparatus 200 individually compares the reception qualities of the component carriers (DL_CC1, DL_CC2) with the threshold value 2 (Qin) and determines the downlink synchronization recovery when DL_CC1 turns to the quality D. Even when DL_CC2 turns to the quality D, the determination of the downlink synchronization state is not affected since DL_CC1 has the quality D.

FIG. 13 is a variation of FIG. 12 and depicts a method of measuring reception quality of each component carrier and managing the downlink synchronization state by comprehensively determining the reception quality of each component carrier in the mobile station apparatus 200 that receives a plurality of downlink frequency bands through the carrier aggregation. DL_CC1 and DL_CC2 in FIG. 13 denote different component carriers received by the mobile station apparatus 200. When the reception quality exceeds the threshold value 2 (Qout) in all the component carriers being received, the mobile station apparatus 200 determines the downlink synchronization recovery and makes a transition of the downlink synchronization state to the synchronization recovery part. If the downlink synchronization recovery is consecutively determined for a certain number of times, the mobile station apparatus 200 makes a transition of the downlink synchronization state to the synchronization part and stops the downlink synchronization protection timer at the same time.

In the example of FIG. 13, the mobile station apparatus 200 individually compares the reception qualities of the component carriers (DL_CC1, DL_CC2) with the threshold value 2 (Qin) and determines the downlink synchronization recovery when both DL_CC1 and DL_CC2 turn to the quality D.

FIG. 14 is another variation of FIG. 12 and depicts a method of measuring reception quality of each of component carriers and managing the downlink synchronization state based on the reception quality of the component carrier lastly falling below Qout among the component carries in the mobile station apparatus 200 that receives a plurality of downlink frequency bands through the carrier aggregation. DL_CC last in FIG. 14 denotes the component carrier lastly falling below Qout among the component carries received by the mobile station apparatus 200. When the reception quality exceeds the threshold value 2 (Qin) in the component carrier lastly falling below Qout, the mobile station apparatus 200 determines a downlink synchronization recovery and makes a transition of the downlink synchronization state to the synchronization recovery part. If the downlink synchronization recovery is consecutively determined for a certain number of times, the mobile station apparatus 200 makes a transition of the downlink synchronization state to the synchronization part, stops the downlink synchronization protection timer at the same time, and cancels the suspension of the transmission to the uplink component carriers.

In the example of FIG. 14, the mobile station apparatus 200 compares the reception quality of the component carriers lastly falling below Qout (DL_CC last) with the threshold value 2 (Qin) and determines the downlink synchronization recovery when the component carrier lastly falling below Qout turns to the quality D.

If not in the carrier aggregation state, the mobile station apparatus 200 can apply the conventional downlink synchronization recovery determination.

Since this embodiment eliminates the need of the mobile station apparatus 200 to manage the downlink synchronization state for each component carrier even in the carrier aggregation, the control is simplified and power consumption is reduced. The mobile station apparatus 200 can use the common control of the downlink synchronization recovery determination in both within the carrier aggregation and without the carrier aggregation, thereby suppressing increase in hardware circuit size or memory capacity used by software.

(Fifth Embodiment)

A fifth embodiment of the present invention will hereinafter be described.

In the method described in the fourth embodiment, only one downlink synchronization state is managed by the mobile station apparatus 200 regardless of the received component carriers in relation to the detection of downlink synchronization recovery. However, the mobile station apparatus 200 needs to determine the reception qualities of all the component carriers being received and comprehensively evaluate the result to determine a downlink synchronization recovery. Therefore, with the mobile station apparatus 200 according to the fifth embodiment, a method of managing the downlink synchronization state based on reception quality of one certain component carrier will be described. Although the fifth embodiment is preferably combined with the downlink synchronization error determination of the first or second embodiment, the fifth embodiment can be combined with another downlink synchronization determination.

The base station apparatus 100 used in this embodiment may be the same as FIG. 5. The mobile station apparatus 200 may be the same as FIG. 6. The network configuration and the correlation of frequency bands same as those respectively depicted in FIGS. 1 and 2 are applicable.

Figure 15:
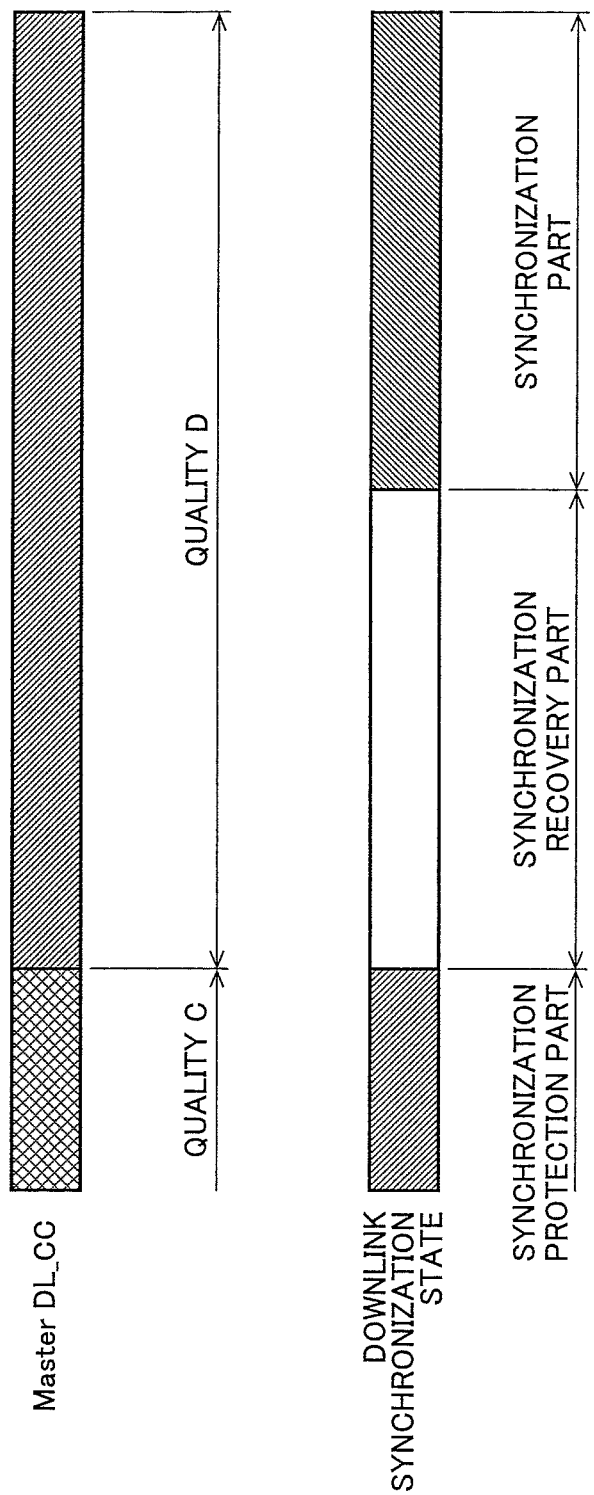
FIG. 15 is a diagram of a method of determining a downlink synchronization recovery and a method of managing a downlink synchronization state according to a fifth embodiment of the present invention.

FIG. 15 depicts a method of measuring reception quality of one component carrier (hereinafter, a master component carrier) determined based on any one of the methods described in the second embodiment and managing the downlink synchronization state based on the reception quality of the master component carrier in the mobile station apparatus 200 that receives a plurality of downlink frequency bands through the carrier aggregation. Therefore, the mobile station apparatus 200 must perform the downlink synchronization recovery determination depicted in FIG. 4 for the master component carrier. Master DL_CC in FIG. 15 denotes the master component carrier received by the mobile station apparatus 200. The quality C and the quality D depicted in FIG. 15 have the same meanings as the fourth embodiment and therefore will not be described.

When the reception quality exceeds the threshold value 2 (Qin) in the master component carrier, the mobile station apparatus 200 determines a downlink synchronization recovery and makes a transition of the downlink synchronization state to the synchronization recovery part. If the downlink synchronization recovery is consecutively determined for a certain number of times, the mobile station apparatus 200 makes a transition of the downlink synchronization state to the synchronization part, stops the downlink synchronization protection timer at the same time, and cancels the suspension of the transmission through the uplink component carriers.

In the example of FIG. 15, the mobile station apparatus 200 compares the reception quality of the master component carrier (Master DL_CC) with the threshold value 2 (Qin) and determines the downlink synchronization recovery when the master component carrier turns to the quality D.

If not in the carrier aggregation state, the mobile station apparatus 200 can directly apply the conventional downlink synchronization error determination.

Since this embodiment enables the mobile station apparatus 200 to manage the downlink synchronization state only for the master component carrier in the carrier aggregation and to use the same conventional control even if a parameter related to the downlink synchronization recovery determination is individually specified for each component carrier in addition to the effect of the first embodiment, the control is further simplified and power consumption is reduced.

(Sixth Embodiment)

A sixth embodiment of the present invention will hereinafter be described.

In the method described in the fourth or fifth embodiment, only one downlink synchronization state is managed by the mobile station apparatus 200 regardless of the received component carriers in relation to the detection of downlink synchronization recovery. However, if the propagation characteristics of the component carriers are significantly different, the mobile station apparatus 200 may better control a plurality of downlink synchronization states for respective component carriers. Therefore, in a method described in the sixth embodiment, the mobile station apparatus 200 manages a downlink synchronization state for each component carrier. Although the sixth embodiment is preferably combined with the downlink synchronization error determination of the third embodiment, the sixth embodiment can be combined with another downlink synchronization determination.

The base station apparatus 100 used in this embodiment may be the same as FIG. 5. The mobile station apparatus 200 may be the same as FIG. 6. To the correspondence relation between the network configuration and the frequency bands, the same relation as those respectively depicted in FIGS. 1 and 2 are applicable. The mobile station apparatus 200 manages the same number of CC downlink synchronization states indicative of downlink synchronization states of respective component carriers as the number of component carriers being received.

Figure 16:
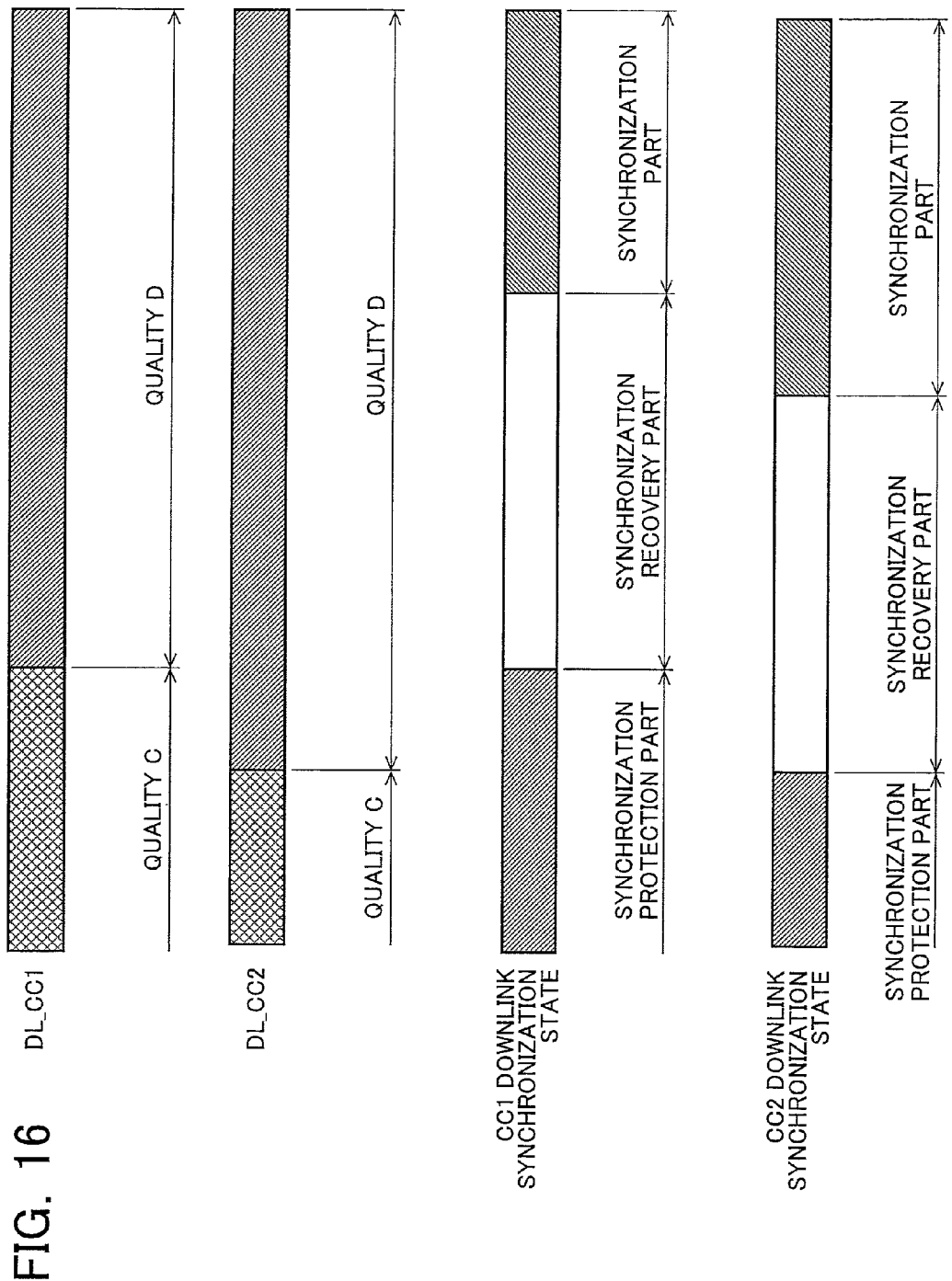
FIG. 16 is a diagram of a method of determining a downlink synchronization recovery and a method of managing a downlink synchronization state according to a sixth embodiment of the present invention.

FIG. 16 depicts a method which the mobile station apparatus 200 measures reception quality for each of component carriers, manages a CC downlink synchronization state for each of the component carriers, and further manages the downlink synchronization state based on the CC downlink synchronization states in the mobile station apparatus 200 that receives a plurality of downlink frequency bands through the carrier aggregation. Therefore, the mobile station apparatus 200 needs to individually perform the downlink synchronization recovery determination depicted in FIG. 4 for a plurality of component carriers. DL_CC1 and DL_CC2 in FIG. 16 denote different component carriers received by the mobile station apparatus 200. A CC1 downlink synchronization state is a downlink synchronization state corresponding to the reception quality of DL_CC1 and a CC2 downlink synchronization state is a downlink synchronization state corresponding to the reception quality of DL_CC2. The quality C and the quality D depicted in FIG. 15 have the same meanings as the fourth embodiment and therefore will not be described.

When the reception quality exceeds the threshold value 2 (Qin) in a component carrier being received, the mobile station apparatus 200 determines a downlink synchronization recovery and makes a transition of the corresponding CC downlink synchronization state to the synchronization recovery part. If the downlink synchronization recovery is consecutively determined for a certain number of times, the mobile station apparatus 200 makes a transition of the corresponding CC downlink synchronization state to the synchronization part, stops the corresponding downlink synchronization protection timer at the same time, and cancels the suspension of the transmission to the uplink component carrier corresponding to the component carrier having the CC downlink synchronization state transited to the synchronization recovery part.

In the example of FIG. 16, the mobile station apparatus 200 individually compares the reception qualities of the component carriers (DL_CC1, DL_CC2) with the threshold value 2 (Qin) and determines the downlink synchronization recovery of each of the component carriers when each component carrier turns to the quality D. The mobile station apparatus 200 resumes the communication through DL_CC1 regardless of the CC2 downlink synchronization state when the CC1 downlink synchronization state is transited to the synchronization part.

If not in the carrier aggregation state, the mobile station apparatus 200 can directly apply the conventional downlink synchronization error determination.

In this embodiment, the mobile station apparatus 200 manages the downlink synchronization state in the carrier aggregation for each component carrier to enable the base station apparatus 100 to control suitable downlink synchronization recovery determination for each component carrier and the occurrence of unnecessary downlink synchronization loss can be suppressed, thereby improving communication quality.

In the embodiments described above, a program for implementing the functions or a part of the functions of the sections of the mobile station apparatus 200 and the base station apparatus 100 may be recorded in a computer readable recording medium and the program recorded in this recording medium may be read and executed by a computer system to control the mobile station apparatus 200 and the base station apparatus 100. A "computer system" as used herein is assumed to include OS and hardware such as peripherals.

A "computer readable recording medium" means a portable medium such as a flexible disk, a magnetic optical disk, ROM, or CD-ROM, and a storage device such as a hard disk built into a computer system. A "computer readable recording medium" is assumed to include those dynamically retaining a program for a short time like a network such as the internet and communication wires when a program is transmitted through a communication line such as a telephone line, and those retaining a program for a certain time like a volatile memory within a computer system acting as a server or a client in such a case. The program may be for the purpose of implementing a section of the functions and may be a program capable of implementing the functions in combination with a program already recorded in a computer system.

Although the embodiments of the present invention have been described in detail with reference to the drawings, specific configurations are not limited to the embodiments and the claims include designs and others, within a range not departing from the spirit of the present invention.

EXPLANATIONS OF REFERENCE NUMERALS

100 . . . base station apparatus; 101 . . . receiving section; 102 . . . demodulating section; 103 . . . decoding section; 104 . . . higher layer; 105 . . . encoding section; 106 . . . modulating section; 107 . . . reference signal generating section; 108 . . . multiplexing section; 109 . . . transmitting section; 110 . . . control section; 200 . . . mobile station apparatus; 201 . . . receiving section; 202 . . . demodulating section; 203 . . . decoding section; 204 . . . measurement processing section; 205 . . . downlink synchronization processing section; 206 . . . higher layer; 207 . . . random access generating section; 208 . . . encoding section; 209 . . . modulating section; 210 . . . transmitting section; 211 . . . transmission band setting section; and 212 . . . control section.

The invention claimed is:

1. A mobile station apparatus configured or programmed to communicate with a base station apparatus, the mobile station apparatus comprising:
   first circuitry configured or programmed to
      perform a measurement of cells on a plurality of downlink frequencies used for a connection with the base station apparatus;
   second circuitry configured or programmed to
      detect a first indication or a second indication, based on the measurement of each cell designated by the base station apparatus, the first indication indicating a measurement result of a cell becomes lower than a first threshold, and the second indication indicating a measurement result of a cell becomes higher than a second threshold; and
   third circuitry configured or programmed to
      in a case where a reconnection procedure is started by expiring a timer corresponding to the each cell, wherein the timer is started in a case where the first indication is indicated consecutively for a certain number of times,
      select a cell, and initiate a random access procedure for requesting a reconnection in the selected cell.

2. The mobile station apparatus of claim 1, wherein the timer is stopped in a case where the second indication is indicated consecutively for a certain number of times.

3. A base station apparatus configured or programmed to communicate with a mobile station apparatus; the base station apparatus comprising:
   first circuitry configured or programmed to
      designate, to the mobile station apparatus, each cell for determining a state of radio link of the mobile station apparatus;
   second circuitry configured or programmed to
      configure, to the mobile station apparatus, a timer for determining the state of radio link of the mobile station apparatus, wherein the timer is started by the mobile station apparatus in a case where a first indication is indicated consecutively for a certain number of times, the first indication indicating a measurement result of a cell becomes lower than a first threshold; and
   third circuitry configured or programmed to
      receive a request of a reconnection, from the mobile station apparatus, in the cell selected by the mobile station apparatus.

4. The base station apparatus of claim 3, wherein the request includes a mobile station apparatus identity.

5. A method to be performed by a mobile station apparatus configured or programmed to communicate with a base station apparatus,
   the method comprising:
      performing a measurement of cells on a plurality of downlink frequencies used for a connection with the base station apparatus,
      detecting a first indication or a second indication, based on the measurement of each cell designated by the base station apparatus, the first indication indicating a measurement result of a cell becomes lower than a first threshold, and the second indication indicating a measurement result of a cell becomes higher than a second threshold, and
      in a case where a reconnection procedure is started by expiring a timer corresponding to the each cell, wherein the timer is started in a case where the first indication is indicated consecutively for a certain number of times,
      selecting a cell, and initiating a random access procedure for requesting a reconnection in the selected cell.

6. The method of claim 5, wherein the timer is stopped in a case where the second indication is indicated consecutively for a certain number of times.

7. A method to be performed by a base station apparatus configured or programmed to communicate with a mobile station apparatus, the method comprising:
   designating, to the mobile station apparatus, each cell for determining a state of radio link of the mobile station apparatus,
   configuring, to the mobile station apparatus, a timer for determining the state of radio link of the mobile station apparatus, wherein the timer is started by the mobile station apparatus in a case where a first indication is indicated consecutively for a certain number of times, the first indication indicating a measurement result of a cell becomes lower than a first threshold, and
   receiving a request of a reconnection, from the mobile station apparatus, in the cell selected by the mobile station apparatus.

8. The method of claim 7, wherein the request includes a mobile station apparatus identity.

* * * * *